US011447131B2

(12) United States Patent
Mimura et al.

(10) Patent No.: US 11,447,131 B2
(45) Date of Patent: Sep. 20, 2022

(54) VEHICLE CONTROL DEVICE, VEHICLE CONTROL METHOD, AND RECORDING MEDIUM

(71) Applicant: HONDA MOTOR CO., LTD., Tokyo (JP)

(72) Inventors: Yoshitaka Mimura, Wako (JP); Yasushi Shoda, Wako (JP); Junpei Noguchi, Wako (JP); Yuki Hara, Wako (JP); Hiroshi Yamanaka, Wako (JP); Ryoma Taguchi, Tokyo (JP); Yuta Takada, Tokyo (JP); Chie Sugihara, Tokyo (JP); Yuki Motegi, Tokyo (JP); Tsubasa Shibauchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 368 days.

(21) Appl. No.: 16/598,069

(22) Filed: Oct. 10, 2019

(65) Prior Publication Data

US 2020/0207349 A1 Jul. 2, 2020

(30) Foreign Application Priority Data

Dec. 26, 2018 (JP) .............................. JP2018-242634

(51) Int. Cl.
*B60W 30/18* (2012.01)
*B60W 10/20* (2006.01)
(Continued)

(52) U.S. Cl.
CPC ............ *B60W 30/18* (2013.01); *B60W 10/04* (2013.01); *B60W 10/20* (2013.01); *G05D 1/0088* (2013.01);
(Continued)

(58) Field of Classification Search
CPC ...................................................... B60W 30/18
See application file for complete search history.

(56) References Cited

U.S. PATENT DOCUMENTS

2010/0114405 A1 5/2010 Elston et al.
2017/0323249 A1 11/2017 Khasis
2020/0130676 A1* 4/2020 Smid .................... G05D 1/0278

FOREIGN PATENT DOCUMENTS

CN 103065462 4/2013
CN 106781608 5/2017
(Continued)

OTHER PUBLICATIONS

Chinese Office Action for Chinese Patent Application No. 201910957656.5 dated Oct. 9, 2021.
(Continued)

*Primary Examiner* — Michael A Berns
(74) *Attorney, Agent, or Firm* — Amin, Turocy & Watson, LLP

(57) ABSTRACT

A vehicle control device includes a recognizer configured to recognize a surrounding situation of a vehicle; a driving control unit configured to control steering and a speed of the vehicle based on a recognition result of the recognizer irrespective of an operation by an occupant; and a communication unit configured to communicate with an external device. When the communication unit receives a pickup request for requesting the vehicle to move from a parking area and causing the occupant to get into the vehicle in a stopping area, the driving control unit causes the vehicle to move from the parking area to the stopping area and changes a condition for the vehicle to leave the stopping area based on the surrounding situation recognized by the recognizer near the stopping area.

10 Claims, 14 Drawing Sheets

(51) Int. Cl.
*B60W 10/04* (2006.01)
*G05D 1/00* (2006.01)
*G06Q 10/02* (2012.01)

(52) U.S. Cl.
CPC ......... *G06Q 10/02* (2013.01); *B60W 2400/00* (2013.01); *B60W 2710/20* (2013.01); *B60W 2720/106* (2013.01); *G05D 2201/0213* (2013.01)

(56) References Cited

FOREIGN PATENT DOCUMENTS

| | | |
|---|---|---|
| CN | 107665476 | 2/2018 |
| CN | 107682419 | 2/2018 |
| CN | 108417081 | 8/2018 |
| CN | 108932862 | 12/2018 |
| JP | 11-312297 | 11/1999 |
| JP | 2002-342879 | 11/2002 |
| JP | 2015-219811 | 12/2015 |
| JP | 2017-182176 | 10/2017 |
| JP | 2017182176 A * | 10/2017 |
| JP | 2018-156641 | 10/2018 |

OTHER PUBLICATIONS

Japanese Office Action for Japanese Patent Application No. 2018-242634 dated Nov. 2, 2021.

* cited by examiner

VEHICLE CONTROL DEVICE, VEHICLE CONTROL METHOD, AND RECORDING MEDIUM

CROSS-REFERENCE TO RELATED APPLICATION

Priority is claimed on Japanese Patent Application No. 2018-242634, filed Dec. 26, 2018, the content of which is incorporated herein by reference.

BACKGROUND

Field of the Invention

The present invention relates to a vehicle control device, a vehicle control method, and a storage medium.

Description of Related Art

In recent years, research on automated control of vehicles has been in progress. With regard to the research, a technology for controlling a vehicle so that the vehicle automatically stops in a parking lot and departs in response to a call of an occupant has been disclosed (for example, Japanese Unexamined Patent Application, First Publication No. 2015-219811).

SUMMARY

As one of the forms of parking lots, there is a form in which when there are a stopping area in which occupants get into or get out of vehicles and a parking area in a distant place, vehicles gather in the stopping area to allow getting into or out of vehicles. In a parking lot of this form, when a vehicle moves to a stopping area through automated driving, an occupant arrives late at the stopping area and the vehicle stays in the stopping area for a long time, and thus there is a possibility of interfering with other vehicles.

The present invention is devised in view of such circumstances and an object of the present invention to provide a vehicle control device, a vehicle control method, and a program capable of allowing an occupant to get into a vehicle smoothly.

For the vehicle control device, the vehicle control method, and the storage medium according to the present invention, the following configurations are adopted.

(1) According to an aspect of the present invention, there is provided a vehicle control device including a recognizer configured to recognize a surrounding situation of a vehicle; a driving control unit configured to control steering and a speed of the vehicle based on a recognition result of the recognizer irrespective of an operation by an occupant; and a communication unit configured to communicate with an external device. When the communication unit receives a pickup request for requesting the vehicle to move from a parking area and causing the occupant to get into the vehicle in a stopping area, the driving control unit causes the vehicle to move from the parking area to the stopping area and changes a condition for the vehicle to leave the stopping area based on the surrounding situation recognized by the recognizer near the stopping area.

(2) In the control device according to the aspect (1), the driving control unit may cause the vehicle to leave the stopping area when a first time has passed after arrival at the stopping area.

(3) In the control device according to the aspect (2), the driving control unit may change the first time based on the surrounding situation recognized by the recognizer.

(4) In the control device according to the aspect (3), when another vehicle arriving at the stopping area later than the vehicle waits in front of the stopping area in a motorcade, the recognizer may recognize a length of a motorcade or the number of vehicles. The driving control unit may change the first time based on the length of the motorcade and the number of vehicles.

(5) In the control device according to the aspect (2), the driving control unit may cause the vehicle to move and wait in a temporary evacuation area different from the parking area after the driving control unit causes the vehicle to leave the stopping area.

(6) In the control device according to the aspect (5), the driving control unit may cause the vehicle to move to the parking area again when the driving control unit causes the vehicle to move and then wait in the temporary evacuation area and a second time has passed.

(7) In the control device according to the aspect (5), the driving control unit may cause the vehicle to move to the parking area when the number of times the vehicle is caused to leave the stopping area reaches a predetermined number of times after the reception of the pickup request.

(8) In the control device according to the aspect (5), the driving control unit may cause the vehicle to move to the parking area rather than the temporary evacuation area when the recognizer recognizes that the temporary evacuation area is full during the movement of the vehicle to the temporary evacuation area.

(9) In the control device according to the aspect (2), the communication unit may receive a reservation situation including a reservation time and whether to make a reservation for another vehicle to use the stopping area. The driving control unit may correct the first time based on a difference between the reservation time received by the communication unit and a residence time in the stopping area.

(10) In the control device according to the aspect (1), the communication unit may notify the external device of an area for which the vehicle heads or whether the vehicle stops.

(11) In the control device according to the aspect (2), the driving control unit may cause the vehicle to leave the stopping area before the first time passes after the arrival at the stopping area when the vehicle waits for the occupant in the stopping area and the recognizer detects lines of sight of people equal to or greater than a given number of people seeing an own vehicle other than the occupant.

(12) According to another aspect of the present invention, there is provided a vehicle control method causing a computer to recognize a surrounding situation of a vehicle; control steering and a speed of the vehicle based on a recognition result of the surrounding situation; receive a pickup request that is transmitted by a communication terminal used by an occupant, and allows the occupant to get into the vehicle and allows the vehicle to leave a parking lot; and cause the vehicle to move from a parking area to a stopping area when the pickup request is received, and change a condition for the vehicle to leave the stopping area based on a surrounding situation recognized in the stopping area.

(13) According to still another aspect of the present invention, there is provided a (computer-readable non-transitory) recording medium that stores a program causing a computer to recognize a surrounding situation of a vehicle;

control steering and a speed of the vehicle based on a recognition result of the surrounding situation; receive a pickup request that is transmitted by a communication terminal used by an occupant, and allows the occupant to get into the vehicle and allows the vehicle to leave a parking lot; and cause the vehicle to move from a parking area to a stopping area when the pickup request is received, and change a condition for the vehicle to leave the stopping area based on a surrounding situation recognized in the stopping area.

According to the aspects of (1) to (13), it is possible to allow an occupant to get into a vehicle more smoothly.

According to the aspects of (1) to (7), (9), and (11), it is further possible to curb delay of a traffic flow by a vehicle when an occupant does not appear in a stopping area.

According to the aspect of (8), it is possible to curb unnecessary movement of a vehicle.

DESCRIPTION OF EMBODIMENTS

Hereinafter, embodiments of a vehicle control device, a vehicle control method, and a storage medium according to the present invention will be described with reference to the drawings.

First Embodiment

[Overall Configuration]

Figure 1:
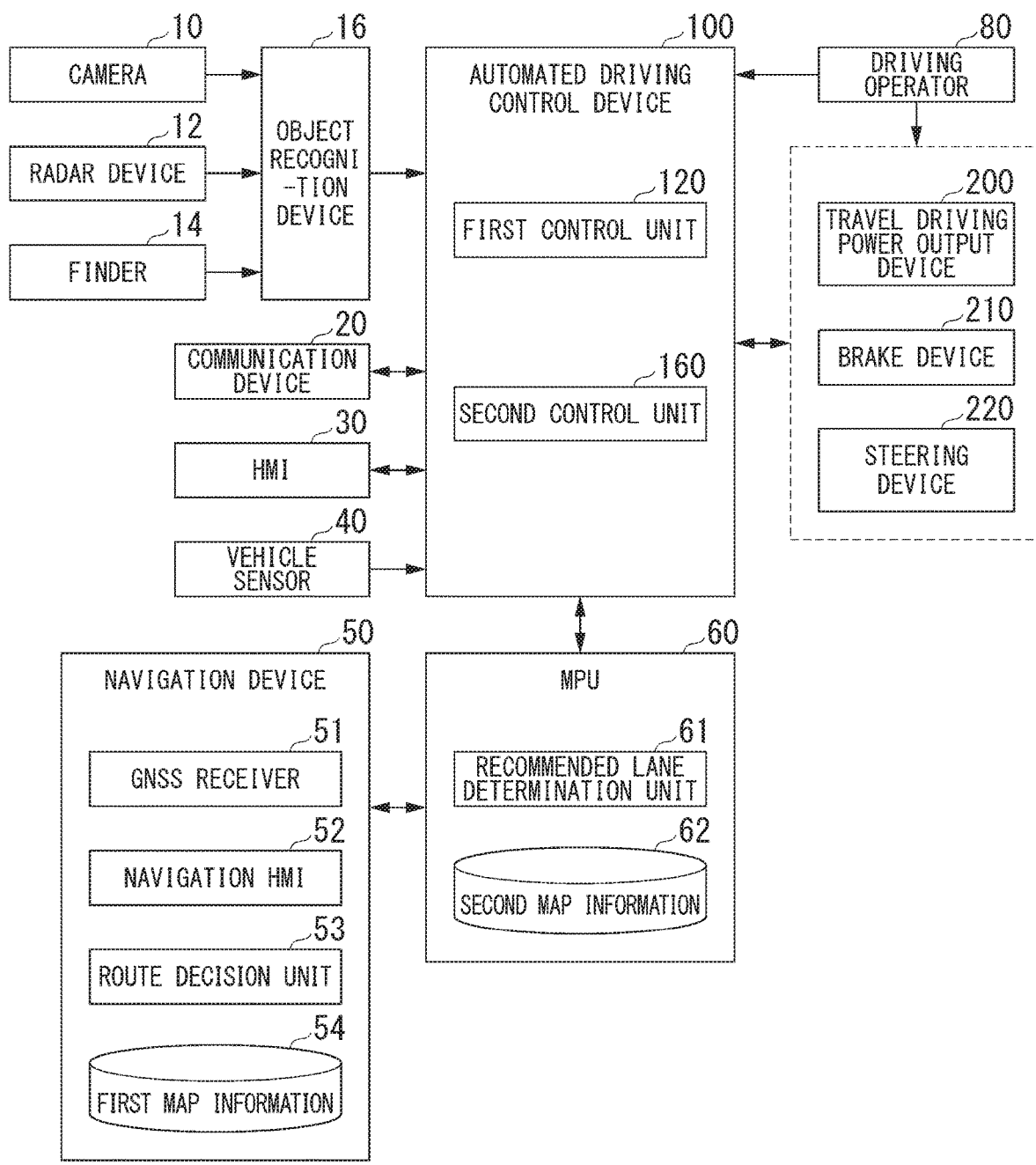
FIG. 1 is a diagram showing a configuration of a vehicle system in which a vehicle control device is used according to a first embodiment.

FIG. 1 is a diagram showing a configuration of a vehicle system 1 in which a vehicle control device is used according to a first embodiment. A vehicle in which the vehicle system 1 is mounted is, for example, a vehicle such as a two-wheeled vehicle, a three-wheeled vehicle, or a four-wheeled vehicle. A driving source of the vehicle includes an internal combustion engine such as a diesel engine or a gasoline engine, an electric motor, and a combination thereof. The electric motor operates using power generated by a power generator connected to the internal combustion engine or power discharged from a secondary cell or a fuel cell.

The vehicle system 1 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100, a travel driving power output device 200, a brake device 210, and a steering device 220. The devices and units are connected to each other via a multiplex communication line such as a controller area network (CAN) communication line, a serial communication line, or a wireless communication network. The configuration shown in FIG. 1 is merely exemplary, a part of the configuration may be omitted, and another configuration may be further added. The automated driving control device 100 is an example of a "vehicle control device."

The camera 10 is, for example, a digital camera that uses a solid-state image sensor such as a charged coupled device (CCD) or a complementary metal oxide semiconductor (CMOS). The single camera 10 is mounted on any portion of a vehicle (hereinafter referred to as an own vehicle M) in which the vehicle system 1 is mounted. In the case of forward imaging, the camera 10 is mounted on an upper portion of a front windshield, a rear surface of a rearview mirror, or the like. For example, the camera 10 periodically images the surroundings of the own vehicle M repeatedly. The camera 10 may be a stereo camera.

The radar device 12 radiates radio waves such as millimeter waves to the surroundings of the own vehicle M and detects radio waves (reflected waves) reflected from an object to detect at least a position (a distance and an azimuth) of the object. The single radar device 12 is mounted on any portion of the own vehicle M. The radar device 12 may detect a position and a speed of an object in conformity with a frequency modulated continuous wave (FM-CW) scheme.

The finder 14 is a light detection and ranging (LIDAR) finder. The finder 14 radiates light to the surroundings of the own vehicle M and measures scattered light. The finder 14 detects a distance to a target based on a time from light emission to light reception. The radiated light is, for example, pulsed laser light. The finder 14 is mounted on any portion of the own vehicle M.

The object recognition device 16 performs a sensor fusion process on detection results from some or all of the camera 10, the radar device 12, and the finder 14 and recognizes a position, a type, a speed, and the like of an object. The object recognition device 16 outputs a recognition result to the automated driving control device 100. The object recognition device 16 may output detection results of the camera 10, the radar device 12, and the finder 14 to the automated driving control device 100 without change. The object recognition device 16 may be omitted from the vehicle system 1.

The communication device 20 communicates with other vehicles or other devices around the own vehicle M using, for example, a cellular network, a Wi-Fi network, Bluetooth (registered trademark), dedicated short range communication (DSRC), or the like. The communication device 20 is an example of a "communication unit."

The HMI 30 presents various types of information to occupants of the own vehicle M and receives input operations by the occupants. For example, the HMI 30 includes various display devices, speakers, buzzers, touch panels, switches, and keys.

The vehicle sensor 40 includes a vehicle speed sensor that detects a speed of the own vehicle M, an acceleration sensor that detects acceleration, a yaw rate sensor that detects an angular velocity around a perpendicular axis, and an azimuth sensor that detects a direction of the own vehicle M.

The navigation device 50 includes, for example, a global navigation satellite system (GNSS) receiver 51, a navigation HMI 52, and a route determination unit 53. The navigation device 50 retains first map information 54 in a storage device such as a hard disk drive (HDD) or a flash memory. The GNSS receiver 51 specifies a position of the own vehicle M based on signals received from GNSS satellites. The position of the own vehicle M may be specified or complemented by an inertial navigation system (INS) using an output of the vehicle sensor 40. The navigation HMI 52 includes a display device, a speaker, a touch panel, and a key. The navigation HMI 52 may be partially or entirely common to the above-described HMI 30. The route determination unit 53 determines, for example, a route from a position of the own vehicle M specified by the GNSS receiver 51 (or any input position) to a destination input by an occupant using the navigation HMI 52 (hereinafter referred to as a route on a map) with reference to the first map information 54. The first map information 54 is, for example, information in which a road shape is expressed by links indicating roads and nodes connected by the links. The first map information 54 may include curvatures of roads and point of interest (POI) information. The route on the map is output to the MPU 60. The navigation device 50 may perform route guidance using the navigation HMI 52 based on the route on the map. The navigation device 50 may be realized by, for example, a function of a terminal device such as a smartphone or a tablet terminal possessed by an occupant. The navigation device 50 may transmit a current position and a destination to a navigation server via the communication device 20 to acquire the same route as the route on the map from the navigation server.

The MPU 60 includes, for example, a recommended lane determination unit 61 and retains second map information 62 in a storage device such as an HDD or a flash memory. The recommended lane determination unit 61 divides the route on the map provided from the navigation device 50 into a plurality of blocks (for example, divides the route in a vehicle movement direction for each 100 [m]) and determines a recommended lane for each block with reference to the second map information 62. The recommended lane determination unit 61 determines in which lane from the left the vehicle travels. When there is a branching location or a joining location in the route on the map, the recommended lane determination unit 61 determines a recommended lane so that the own vehicle M can travel in a reasonable traveling route to move to a branching destination.

The second map information 62 is map information that has higher precision than the first map information 54. The second map information 62 includes, for example, information regarding the middles of lanes or information regarding boundaries of lanes. The second map information 62 may include road information, traffic regulation information, address information (address and postal number), facility information, and telephone number information. The second map information 62 may be updated frequently when the communication device 20 is used to communicate with other devices.

The driving operator 80 includes, for example, an accelerator pedal, a brake pedal, a shift lever, a steering wheel, a heteromorphic steering, a joystick, and other operators. A sensor that detects whether there is an operation or an operation amount is mounted on the driving operator 80 and a detection result is output to all or some of the automated driving control device 100, the travel driving power output device 200, the brake device 210, and the steering device 220.

The automated driving control device 100 includes, for example, a first control unit 120 and a second control unit 160. For example, each of the first control unit 120 and a second control unit 160 is realized by causing a hardware processor such as a central processing unit (CPU) to execute a program (software). Some or all of the constituent elements may be realized by hardware (a circuit unit including circuitry) such as a large scale integration (LSI), an application specific integrated circuit (ASIC), a field-programmable gate array (FPGA), or a graphics processing unit (GPU) or may be realized by software and hardware in cooperation. The program may be stored in advance in a storage device (a storage device including a non-transitory storage medium) such as an HDD or a flash memory of the automated driving control device 100 or may be stored in a storage medium detachably mounted on a DVD, a CD-ROM, or the like so that the storage medium (non-transitory storage medium) is mounted on a drive device and is installed on the HDD or the flash memory of the automated driving control device 100.

Figure 2:
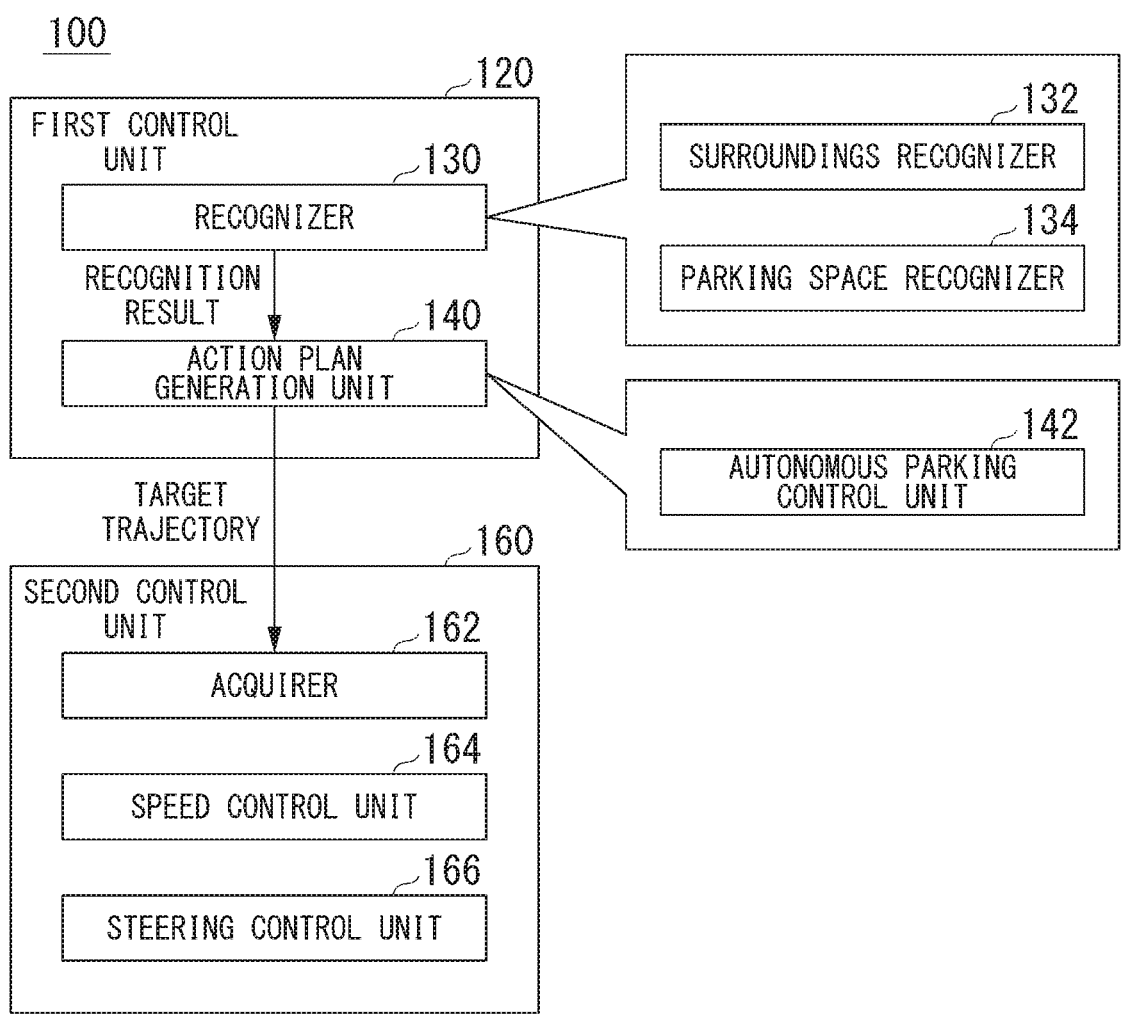
FIG. 2 is a diagram showing functional configurations of first and second control units.

FIG. 2 is a diagram showing functional configurations of the first control unit 120 and a second control unit 160. The first control unit 120 includes, for example, a recognizer 130 and an action plan generation unit 140. The first control unit 120 realizes, for example, a function by artificial intelligence (AI) and a function by a model given in advance in parallel. For example, a function of "recognizing an intersection" may be realized by performing recognition of an intersection by deep learning or the like and recognition based on a condition given in advance (a signal, a road sign, or the like which can be subjected to pattern matching) in parallel, scoring both the recognitions, and performing evaluation comprehensively. Thus, reliability of automated driving is guaranteed.

The recognizer 130 includes a surroundings recognizer 132 and a parking space recognizer 134. The surroundings recognizer 132 recognizes states such as positions, speeds, or acceleration of objects around the own vehicle M based on information input from the camera 10, the radar device 12, and the finder 14 via the object recognition device 16. For example, the positions of the objects are recognized as positions on the absolute coordinates in which a representative point (a center of gravity, a center of a driving shaft, or the like) of the own vehicle M is the origin and are used for control. The positions of the objects may be represented as representative points such as centers of gravity, corners, or the like of the objects or may be represented as expressed regions. A "state" of an object may include acceleration or jerk of the object or an "action state" (for example, whether a vehicle is changing a lane or is attempting to change the lane).

The surroundings recognizer 132 recognizes, for example, a lane in which the own vehicle M is traveling (a traveling lane). For example, the surroundings recognizer 132 recognizes the traveling lane by comparing patterns of road mark lines (for example, arrangement of continuous lines and broken lines) obtained from the second map information 62 with patterns of road mark lines around the own vehicle M recognized from images captured by the camera 10. The surroundings recognizer 132 may recognize a traveling lane by mainly recognizing runway boundaries (road boundaries) including road mark lines or shoulders, curbstones, median strips, and guardrails without being limited to road mark lines. In this recognition, the position of the own vehicle M acquired from the navigation device 50 or a process result by INS may be added. The surroundings recognizer 132 recognizes temporary stop lines, obstacles, red signals, toll gates, and other road events.

The surroundings recognizer 132 recognizes a position or an attitude of the own vehicle M with respect to the travel lane when the surroundings recognizer 132 recognizes the travel lane. For example, the surroundings recognizer 132 may recognize a deviation from the middle of a lane of a standard point of the own vehicle M and an angle formed with a line extending along the middle of a lane in the traveling direction of the own vehicle M as a relative position and posture of the own vehicle M to the traveling lane. Instead of this, the surroundings recognizer 132 may recognize a position or the like of the standard point of the own vehicle M with respect to a side end portion (a road mark line or a road boundary) of any traveling lane as the relative position of the own vehicle M to the traveling lane.

The details of the function of the parking space recognizer 134 will be described later.

The action plan generation unit 140 generates a target trajectory along which the own vehicle M travels in future automatically (irrespective of an operation of a driver or the like) so that the own vehicle is traveling along a recommended lane determined by the recommended lane determination unit 61 and handles a surrounding situation of the own vehicle M in principle. The target trajectory includes, for example, a speed component. For example, the target trajectory is expressed by arranging spots (trajectory points) at which the own vehicle M will arrive in sequence. The trajectory point is a spot at which the own vehicle M will arrive for each predetermined traveling distance (for example, about several [m]) in a distance along a road. Apart from the trajectory points, target acceleration and a target speed are generated as parts of the target trajectory for each of predetermined sampling times (for example, about every several tenths of a second). The trajectory point may be a position at which the own vehicle M arrives at the sampling time for each predetermined sampling time. In this case, information regarding the target acceleration or the target speed is expressed according to an interval between the trajectory points.

The action plan generation unit 140 may set an automated driving event when the target trajectory is generated. As the automated driving event, there are a constant speed traveling event, a low speed track traveling event, a lane changing event, a branching event, a joining event, a takeover event, valet parking, an autonomous parking event in which unmanned traveling and parking are performed, and the like. The valet parking refers to a form of a parking lot in which a parking area is in a place away from a stopping area in which an occupant gets into or gets out of a vehicle. The action plan generation unit 140 generates the target trajectory in accordance with an activated event. The action plan generation unit 140 includes an autonomous parking control unit 142 that is activated when an autonomous parking event is performed. The details of a function of the autonomous parking control unit 142 will be described later.

The second control unit 160 controls the travel driving power output device 200, the brake device 210, and the steering device 220 so that the own vehicle M passes along the target trajectory generated by the action plan generation unit 140 at a scheduled time. A combination of the action plan generation unit 140 and the second control unit 160 is an example of a "driving control unit."

Referring back to FIG. 2, the second control unit 160 includes, for example, an acquirer 162, a speed control unit 164, and a steering control unit 166. The acquirer 162 acquires information regarding the target trajectory (trajectory points) generated by the action plan generation unit 140 and stores the information in a memory (not shown). The speed control unit 164 controls the travel driving power output device 200 or the brake device 210 based on a speed element incidental to the target trajectory stored in the memory. The steering control unit 166 controls the steering device 220 in accordance with a curve state of the target trajectory stored in the memory. Processes of the speed control unit 164 and the steering control unit 166 are realized, for example, by combining feed-forward control and feedback control. For example, the steering control unit 166 performs the feed-forward control in accordance with a curvature of a road in front of the own vehicle M and the feedback control based on separation from the target trajectory in combination.

The travel driving power output device 200 outputs a travel driving force (torque) for traveling the vehicle to a driving wheel. The travel driving power output device 200 includes, for example, a combination of an internal combustion engine, an electric motor and a transmission, and an electronic control unit (ECU) controlling these units. The ECU controls the foregoing configuration in accordance with information input from the second control unit 160 or information input from the driving operator 80.

The brake device 210 includes, for example, a brake caliper, a cylinder that transmits a hydraulic pressure to the brake caliper, an electronic motor that generates a hydraulic pressure to the cylinder, and a brake ECU. The brake ECU controls the electric motor in accordance with information input from the second control unit 160 or information input from the driving operator 80 such that a brake torque in accordance with a brake operation is output to each wheel. The brake device 210 may include a mechanism that transmits a hydraulic pressure generated in response to an operation of the brake pedal included in the driving operator 80 to the cylinder via a master cylinder as a backup. The brake device 210 is not limited to the above-described configuration and may be an electronic control type hydraulic brake device that controls an actuator in accordance with information input from the second control unit 160 such that a hydraulic pressure of the master cylinder is transmitted to the cylinder.

The steering device 220 includes, for example, a steering ECU and an electric motor. The electric motor works a force to, for example, a rack and pinion mechanism to change a direction of a steering wheel. The steering ECU drives the electric motor to change the direction of the steering wheel in accordance with information input from the second control unit 160 or information input from the driving operator 80.

[Autonomous Parking Event: At Time of Entrance]

Figure 3:
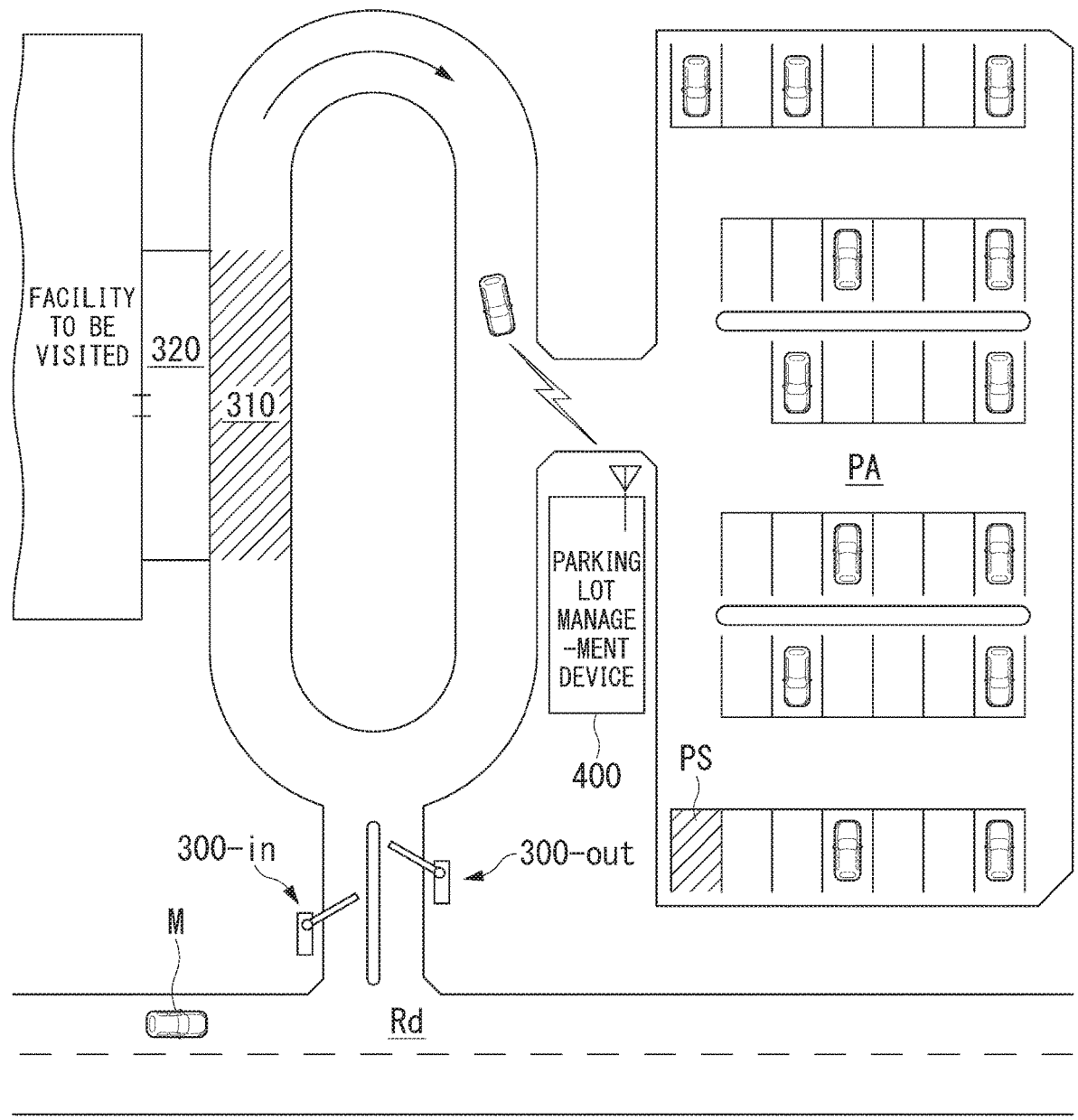
FIG. 3 is a diagram schematically showing a scenario in which an autonomous parking event is performed according to the first embodiment.

For example, the autonomous parking control unit 142 parks the own vehicle M in a parking space based on information acquired from a parking lot management device 400 through the communication device 20. FIG. 3 is a diagram schematically showing a scenario in which an autonomous parking event is performed according to the first embodiment. Gates 300-in and 300-out are provided on a route from a road Rd to a facility to be visited. The own vehicle M passes through the gate 300-in through manual driving or automated driving and enters to a stopping area 310. The stopping area 310 is, for example, a region virtually set by the surroundings recognizer 132 and is a region extended in a path width direction from both ends of a carriage porch area 320 connected to the facility to be visited. When it is recognized that a recommended stop position in which a stop line, a mark line, or the like is provided to face the carriage porch area 320 is set, the surroundings recognizer 132 considers a recommended stop position as the stopping area 310.

After an occupant gets out of a vehicle in the stopping area 310, the own vehicle M performs unmanned automated driving and starts an autonomous parking event for moving to a parking space PS in the parking area PA. A trigger to start the autonomous parking event may be, for example, any operation by the occupant or may be wireless reception of a predetermined signal from the parking lot management device 400. When the autonomous parking event starts, the autonomous parking control unit 142 controls the communication device 20 such that a parking request is transmitted to the parking lot management device 400. Then, the own vehicle M moves in accordance with guidance of the parking lot management device 400 or moves performing sensing by itself from the stopping area 310 to the parking area PA.

Figure 4:
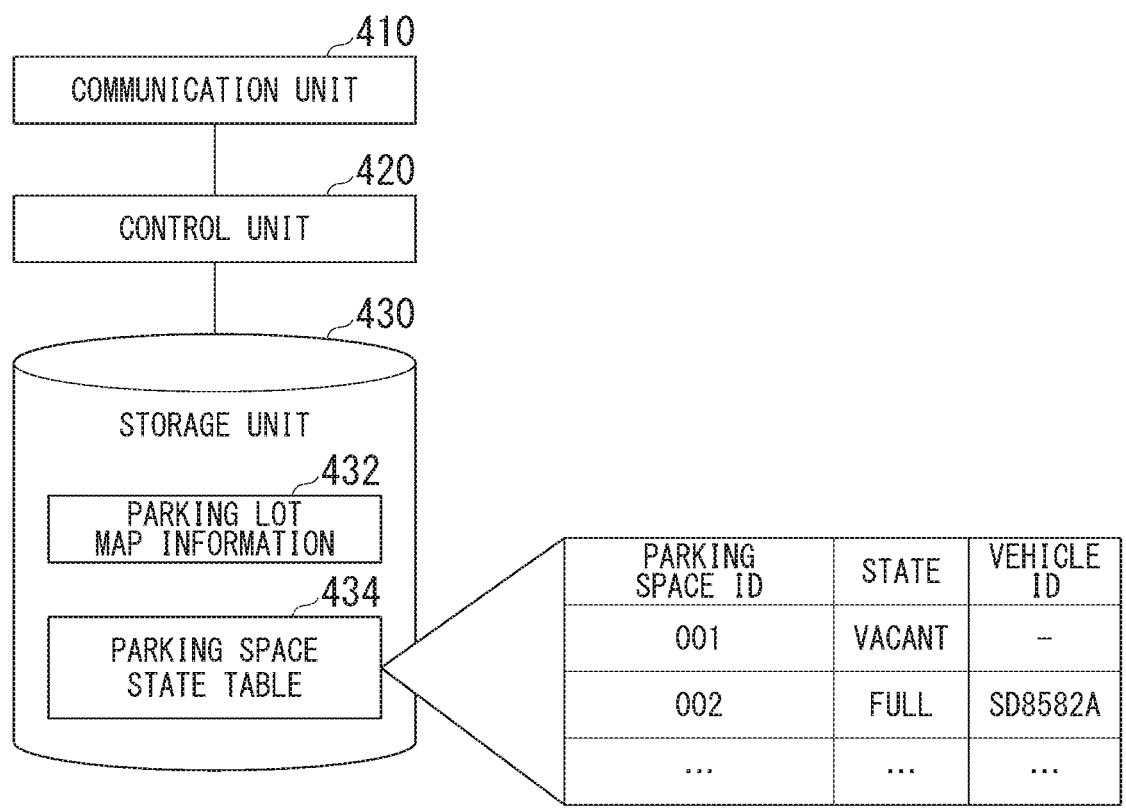
FIG. 4 is a diagram showing an example of a configuration of a parking lot management device.

FIG. 4 is a diagram showing an example of a configuration of the parking lot management device 400. The parking lot management device 400 includes, for example, a communication unit 410, a control unit 420, and a storage unit 430. The storage unit 430 stores information such as parking lot map information 432 and a parking space state table 434.

The communication unit 410 communicates with the own vehicle M and other vehicles wirelessly. The control unit 420 guides a vehicle to the parking space PS based on information acquired by the communication unit 410 and information stored in the storage unit 430. The parking lot map information 432 is information that geometrically represents a structure of the parking area PA. The parking lot map information 432 includes coordinates of each parking space PS. In the parking space state table 434, for example, a state which indicates a vacant state and a full (parking) state and a vehicle ID which is identification information of a vehicle parked in the case of the full state are associated with a parking space ID which is identification information of the parking space PS.

When the communication unit 410 receives a parking request from a vehicle, the control unit 420 extracts the parking space PS of which a state is a vacant state with reference to the parking space state table 434, acquires a position of the extracted parking space PS from the parking lot map information 432, and transmits a suitable route to the acquired position of the parking space PS to the vehicle through the communication unit 410. The control unit 420 instructs a specific vehicle to stop or move slowly, as necessary, based on a positional relation between a plurality of vehicles so that the vehicles do not simultaneously advance to the same position.

In a vehicle receiving the route (hereinafter, assumed to be the own vehicle M), the autonomous parking control unit 142 generates a target trajectory based on the route. When the own vehicle M approaches the parking space PS which is a target, the parking space recognizer 134 recognizes parking frame lines or the like marking the parking space PS, recognizes a detailed position of the parking space PS, and supplies the detailed position of the parking space PS to the autonomous parking control unit 142. The autonomous parking control unit 142 receives the detailed position of the parking space PS, corrects the target trajectory, and parks the own vehicle M in the parking space PS.

[Autonomous Parking Event: At the Time of Departure]

The autonomous parking control unit 142 and the communication device 20 are maintained in an operation state even while the own vehicle M is parked. For example, when the communication device 20 receives a pickup request for requesting a vehicle to move from the parking area PA and allowing an occupant to get into the vehicle in the stopping area 310 from a terminal device of the occupant, the autonomous parking control unit 142 activates a system of the own vehicle M and causes the own vehicle M to move to the stopping area 310. The pickup request may be a request for causing the own vehicle M to depart at once and start moving to the stopping area 310, may be a request for designating an estimated time of departure at which movement to the stopping area 310 starts, or may be a request for designating an estimated time of arrival (a time at which arrival is expected) at the stopping area 310. At this time, the autonomous parking control unit 142 controls the communication device 20 to transmit a launch request to the parking lot management device 400 in addition to information regarding the estimated time of departure or the estimated time of arrival (the time at which arrival is expected) at the stopping area 310 included in the pickup request. The control unit 420 of the parking lot management device 400 instructs a specific vehicle to stop or move slowly, as necessary, based on a positional relation between a plurality of vehicles so that the vehicles do not simultaneously enter to the same position, as in the time of entrance. The parking lot management device 400 adjusts the estimated time of arrival in accordance with a reception order of pickup requests or adjustment with respect to each occupant when times at which arrival at the stopping area 310 is expected overlap between a plurality of vehicles. When the own vehicle M is caused to move to the stopping area 310 and picks up an occupant, the autonomous parking control unit 142 stops the operation. Thereafter, manual driving or automated driving by another functional unit starts. The autonomous parking control unit 142 may control the communication device 20 such that the terminal device of the occupant is notified of information regarding a state or position of the own vehicle M when the own vehicle M starts moving to the stopping area 310 or arrives at the stopping area 310.

The present invention is not limited to the above description. The autonomous parking control unit 142 may find a vacant parking space by itself based on a detection result of the camera 10, the radar device 12, the finder 14, or the object recognition device 16 irrespective of communication and may park the own vehicle M in the found parking space.

At the time of departure, similarly, the own vehicle M may be moved to the stopping area 310 by itself irrespective of communication.

The surroundings recognizer 132 recognizes whether there is another vehicle entering to the stopping area 310 similarly to the own vehicle M as a surrounding situation, for example, at the time of entrance to the stopping area 310. For example, when the surroundings recognizer 132 recognizes another vehicle entering the stopping area 310, the surroundings recognizer 132 further recognizes that the other vehicle is waiting in front of the stopping area 310 in a motorcade.

The order in the motorcade may be an arrival order of each vehicle in the motorcade or may be an order in which an estimated time of departure of each vehicle or an estimated departure order is managed by an external device such as the parking lot management device 400. The motorcade may be a physically formed motorcade or a logically formed motorcade (for example, each vehicle applies for entrance to the stopping area 310 to the parking lot management device 400, and enters the stopping area 310 from the parking area PA in a sequence of vehicles permitted by the parking lot management device 400, and then each vehicle waits inside the parking area PA before permission). In the following description, it is assumed that the motorcade is physically formed.

[Movement to Stopping Area]

The autonomous parking control unit 142 causes the own vehicle M to move from the parking area PA to the stopping area 310 in accordance with guidance of the parking lot management device 400 when the communication device 20 receives the pickup request. When the surroundings recognizer 132 recognizes another vehicle moving to the stopping area 310, the autonomous parking control unit 142 causes the own vehicle M to move to the stopping area 310 in accordance with an action of the other vehicle. For example, the autonomous parking control unit 142 causes the own vehicle M to travel so that the own vehicle M does not passes another vehicle and is not passed by another vehicle.

For example, when the surroundings recognizer 132 recognizes that other vehicles form a motorcade in an order of movement to the stopping area 310 and are waiting, the autonomous parking control unit 142 causes the own vehicle M to queue in the motorcade and wait for its turn to move the stopping area 310.

[Waiting Control in Stopping Area]

The autonomous parking control unit 142 stops an operation when an occupant has completed getting into the own vehicle M in the stopping area 310 and the occupant performs an operation indicating that departure is possible. Thereafter, manual driving or automated driving by another functional unit starts. When the occupant has not completed getting into the own vehicle M in the stopping area 310, the autonomous parking control unit 142 changes conditions for the own vehicle to leave the stopping area 310 based on the surrounding situation recognized by the surroundings recognizer 132 in the stopping area 310.

Figure 5:
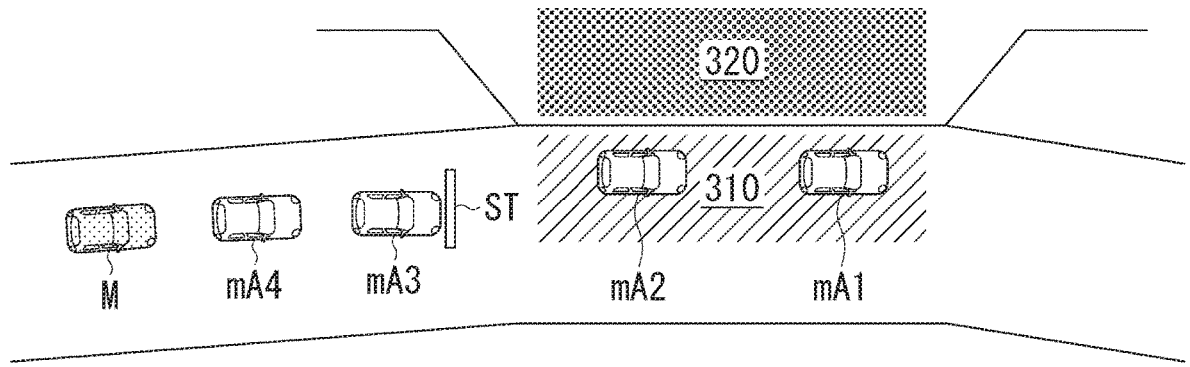
FIG. 5 is a diagram showing an example of an autonomous process by an autonomous parking control unit.
Figure 6:
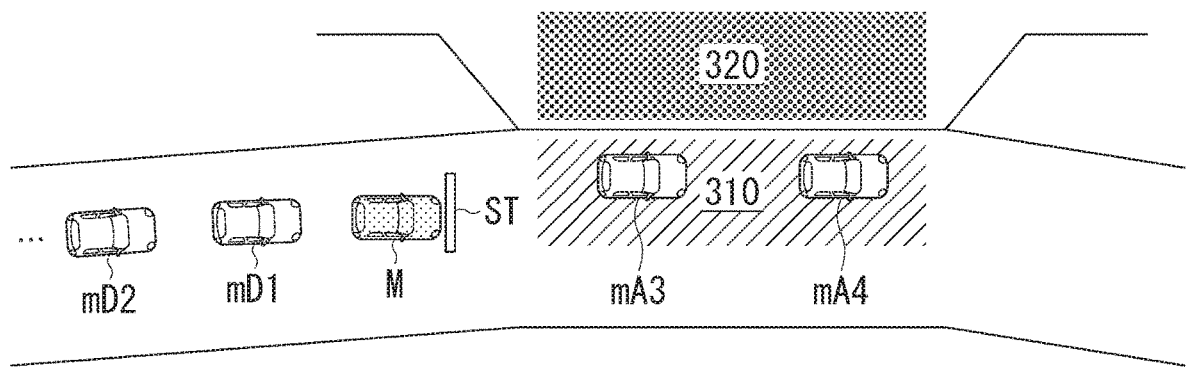
FIG. 6 is a diagram showing an example of the autonomous process by the autonomous parking control unit.
Figure 7:
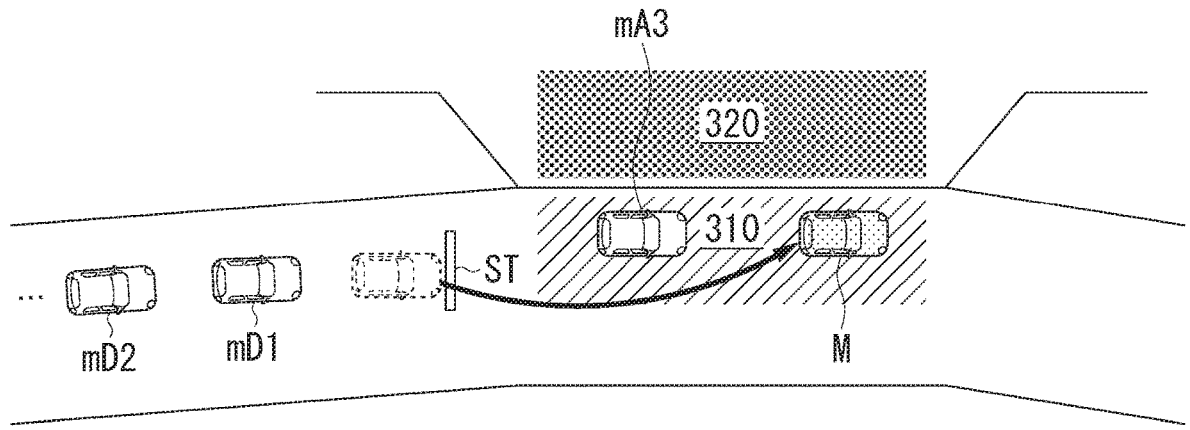
FIG. 7 is a diagram showing an example of the autonomous process by the autonomous parking control unit.

FIGS. 5 to 7 are diagrams showing an example of an autonomous process by the autonomous parking control unit 142. When the own vehicle M is caused to move to the stopping area 310, the autonomous parking control unit 142 causes the own vehicle M to wait by causing the own vehicle M to stop or move slowly in the stopping area 310 so that an occupant can get into the own vehicle M. When there is no vacant space in the stopping area 310, the autonomous parking control unit 142 recognizes the position of another vehicle waiting to move to a stop line ST or the stopping area 310 and causes the own vehicle M to wait until a vacant space is available while stopping or moving slowly at a suitable position.

As shown in FIG. 5, when the surroundings recognizer 132 recognizes that other vehicles mA1 and mA2 have stopped inside the stopping area 310 and other vehicles mA3 and mA4 form a motorcade to move to the stopping area 310, the autonomous parking control unit 142 causes the own vehicle M to move and follow the end of the motorcade. That is, the autonomous parking control unit 142 causes the own vehicle M to move to a position at which the own vehicle M is aligned with the other vehicle mA4 in the sideway direction relative to the traveling direction, while maintaining a constant inter-vehicle distance with respect to the other vehicle mA4. The autonomous parking control unit 142 waits for its turn to cause the own vehicle M to move to the stopping area 310 by following the other vehicle mA4 which is a front traveling vehicle traveling immediately before the own vehicle M while maintaining a constant inter-vehicle distance.

FIG. 6 illustrates an aspect in which the other vehicles mA1 and mA2 having stopped inside the stopping area 310 in the state shown in FIG. 5 have left the stopping area 310 and the other vehicles mA3 and mA4 having also formed a motorcade have stopped inside the stopping area 310. The autonomous parking control unit 142 ends the control for following the front traveling vehicle when the other vehicle mA4 which is the front traveling vehicle forming the motorcade moves inside of the stopping area 310 and the own vehicle M is the head of a motorcade, as shown in FIG. 6. Further, for example, the autonomous parking control unit 142 determines a position at which the own vehicle M is stopped based on the stop line ST recognized by the surroundings recognizer 132 until the surroundings recognizer 132 recognizes a vacant space in the stopping area 310, and causes the own vehicle M to wait at the position.

When a vacant space in the stopping area 310 is recognized, the autonomous parking control unit 142 causes the own vehicle M to move to the vacant space. The vacant space is a space which is vacant with respect to the front to rear direction with an additional margin for a vehicle length of the own vehicle that is to be parked.

For example, the surroundings recognizer 132 recognizes that the other vehicle mA4 which is the front traveling vehicle has left the stopping area 310 and a vacant space is near the stop position of the other vehicle mA4. The autonomous parking control unit 142 causes the own vehicle M to move to the vacant space in the stopping area 310 recognized by the surroundings recognizer 132 and stops the own vehicle M in the vacant space, as shown in FIG. 7.

The autonomous parking control unit 142 measures a time in which the own vehicle M stops in the stopping area 310 as a waiting time. For example, when the entire own vehicle M enters the inside of the stopping area 310 and a speed of the own vehicle M is equal to or less than a predetermined vehicle speed, the autonomous parking control unit 142 starts measuring a waiting time from start of waiting for an occupant. Instead of this, for example, when a part of the own vehicle M enters the inside of the stopping area 310 and a speed of the own vehicle M is equal to or less than the predetermined vehicle speed, the autonomous parking control unit 142 may start measuring a waiting time from start of waiting for the occupant. The autonomous parking control unit 142 may notify a terminal device used by the occupant that the own vehicle is wait for the occupant in the stopping area 310 via the communication device 20.

The autonomous parking control unit 142 causes the own vehicle M to leave the stopping area 310 when the own vehicle M starts waiting in the stopping area 310 and then a first time (for example, a time of about several [sec]) has passed. The "waiting" refers to, for example, a state in which the own vehicle M has stopped in the stopping area 310 and then the occupant starts getting into the vehicle. The "waiting" does not include a stop time in which the occupant of the own vehicle M recognizes a stop position of the own vehicle M and moves in the direction of the own vehicle M or puts a luggage into the own vehicle M.

The autonomous parking control unit 142 changes leaving conditions by changing (correcting) the first time depending on a surrounding situation recognized by the surroundings recognizer 132 or a reservation situation received by the communication device 20. A change in the first time is an example of a change in conditions for a vehicle to leaves the stopping area 310.

The "change in the first time" is performed based on events such as (1) to (3) below, for example:

(1) a length of a motorcade or the number of vehicles moving to the stopping area 310 recognized by the surroundings recognizer 132;

(2) recognizing the number of people equal to or greater than a given number of people other than the occupant of the own vehicle M by the surroundings recognizer 132 and detection of lines of sight of the people seeing the own vehicle M; and (3) receiving of a reservation situation including a reservation time and whether to make a reservation for another vehicle to use the stopping area 310 by the communication device 20.

[(1) Change in First Time Based on Motorcade]

When the own vehicle M is caused to move to the stopping area 310 and the surroundings recognizer 132 recognizes that other vehicles moving to the stopping area 310 have formed a motorcade in an order of movement to the stopping area 310 and wait likewise, the autonomous parking control unit 142 changes the leaving conditions based on a recognition result of the length of the motorcade.

The length of the motorcade is, for example, a length from the head to the end of the motorcade based on images captured by the camera 10. When the surroundings recognizer 132 may not recognize a vehicle at the head of the motorcade but can recognize a vehicle at the end of the motorcade (or the surroundings recognizer 132 may not recognize the vehicle at the end of the motorcade but can recognize the vehicle at the head of the motorcade), a length from the head (or the stopping area 310) of the motorcade to the end of the motorcade may be derived with reference to the parking lot map information 432. The length of the motorcade may be derived by multiplying the number of vehicles forming the motorcade by a sum length (for example, about 6 [m]) of the entire length of a standard vehicle and an inter-vehicle distance. In the following description, "a length of the motorcade equal to or greater than a predetermined length" may be replaced with "the number of vehicles forming the motorcade equal to or greater than a predetermined number."

When the length of the motorcade recognized by the surroundings recognizer 132 is equal to or greater than a predetermined length, the autonomous parking control unit 142 shortens the first time to prevent the own vehicle M from occupying a corner of the stopping area 310 and delaying a traffic flow in a case in which the occupant does not arrive at the carriage porch area 320 and may not get into a vehicle.

For example, the autonomous parking control unit 142 shortens the first time by about 15 [sec] when another vehicle arriving at the stopping area 310 later than the own vehicle M waits in front of the stopping area 310 in a motorcade and the surroundings recognizer 132 recognizes that the length of the motorcade is equal to or greater than a predetermined length. An amount of change of the first time may be varied in accordance with the length of the motorcade or the amount of change may be adjusted so that the first time becomes shorter as the length of the motorcade becomes longer. In this way, by yielding the stopping area 310 to a following vehicle waiting in the motorcade, it is possible to curb lengthening of the motorcade.

When the surroundings recognizer 132 recognizes that there is no motorcade, the autonomous parking control unit 142 may lengthen the first time by about 15 [sec] since there is a low possibility of the traffic flow being delayed even when the own vehicle M does not leave the stopping area 310.

[(2) Change in First Time Based on Time of Detection of Lines of Sight]

When the surroundings recognizer 132 recognizes that people (for example, occupants of other vehicles or people in charge of security of the facility to be visited) other than the occupant of the own vehicle M are inside the carriage porch area 320 and detects lines of sight of people equal to or greater than a given number of people seeing in the direction of the own vehicle M, the autonomous parking control unit 142 causes the own vehicle M to leave the stopping area 310 even when the first time has not passed (that is, changes the first time such that it becomes shorter). This is based on the assumption that the people seeing the own vehicle M will be suspicious or and dissatisfied with the own vehicle M stopping for a long time. For example, the lines of sight of people other than the occupant are estimated from the directions of the faces of the people recognized in images captured by the camera 10. The surroundings recognizer 132 may detect gestures of people pointing toward the own vehicle M in addition to the lines of sight of the people other than the occupant of the own vehicle M.

[(3) Correction of First Time Based on Reservation Time]

When the parking lot management device 400 receives a reservation of a time in which each vehicle is permitted to use the stopping area 310, the autonomous parking control unit 142 may correct the first time based on a difference between the reservation time and a time in which the own vehicle M stays in the stopping area 310. For example, the communication device 20 receives a reservation situation including reservation times and whether to make a reservation for other vehicles to use the stopping area 310 and outputs the reservation situation to the autonomous parking control unit 142. The autonomous parking control unit 142 recognizes a reservation time and whether to make a reservation for the own vehicle M or a rear vehicle waiting in the motorcade based on a reservation situation received by the communication device 20 and corrects the first time based on the reservation time. In this case, for example, when a timing at which a reservation time of the own vehicle M ends (or a timing at which a reservation time of the rear vehicle waiting in the motorcade starts) is earlier than end of the first time, the autonomous parking control unit 142 corrects the first time to shorten the first time so that the reservation time is kept.

[Control after Leaving Stopping Area]

For example, when the own vehicle M leaves the stopping area 310 without allowing the occupant to get into the own vehicle M, the autonomous parking control unit 142 performs control such that the own vehicle M lines up in the motorcade moving to the stopping area 310 again.

Referring back to FIG. 7, when the end of the motorcade is the other vehicle mD3, for example, the autonomous parking control unit 142 causes the own vehicle M to leave the stopping area 310 and further lines up after the other vehicle mD3 again. At this time, the autonomous parking control unit 142 performs a process of adding the number of times the own vehicle M lines up in the motorcade after departure of the parking area PA by one (time).

For example, when the own vehicle M leaves the stopping area 310 without allowing the occupant to get into the own vehicle M and the number of times the own vehicle M has lined up in the motorcade after reception of a pickup request from a terminal device used by the occupant and starting from the parking area PA is less than a predetermined number of times (for example, about 2 or 3 [times]), the autonomous parking control unit 142 may retry to cause the own vehicle M to line up in the motorcade again and allow the occupant to get into the own vehicle M.

The predetermined number of times counted by the autonomous parking control unit 142 may be set in advance by the occupant of the own vehicle M, may vary in accordance with a surrounding situation recognized by the surroundings recognizer 132, or may be adjusted by the parking lot management device 400. For example, when the length of the motorcade moving to the stopping area 310 is equal to or greater than a predetermined length and the parking lot management device 400 adjusts the predetermined number of times to further reduce the predetermined number of times than at a normal time to alleviate or curb congestion in the parking lot, the autonomous parking control unit 142 receives the adjustment (that is, receives adjustment in which the own vehicle lines up in the motorcade for the retry up to three [times] at a normal time, but the retrying is possible by only one [time] during a congestion time). The autonomous parking control unit 142 may adjust the predetermined number of times in accordance with a consumption amount of energy of a driving source consumed to line up in the motorcade again or a movement distance at the time of lining-up again.

[Notification to External Device]

Figure 8:
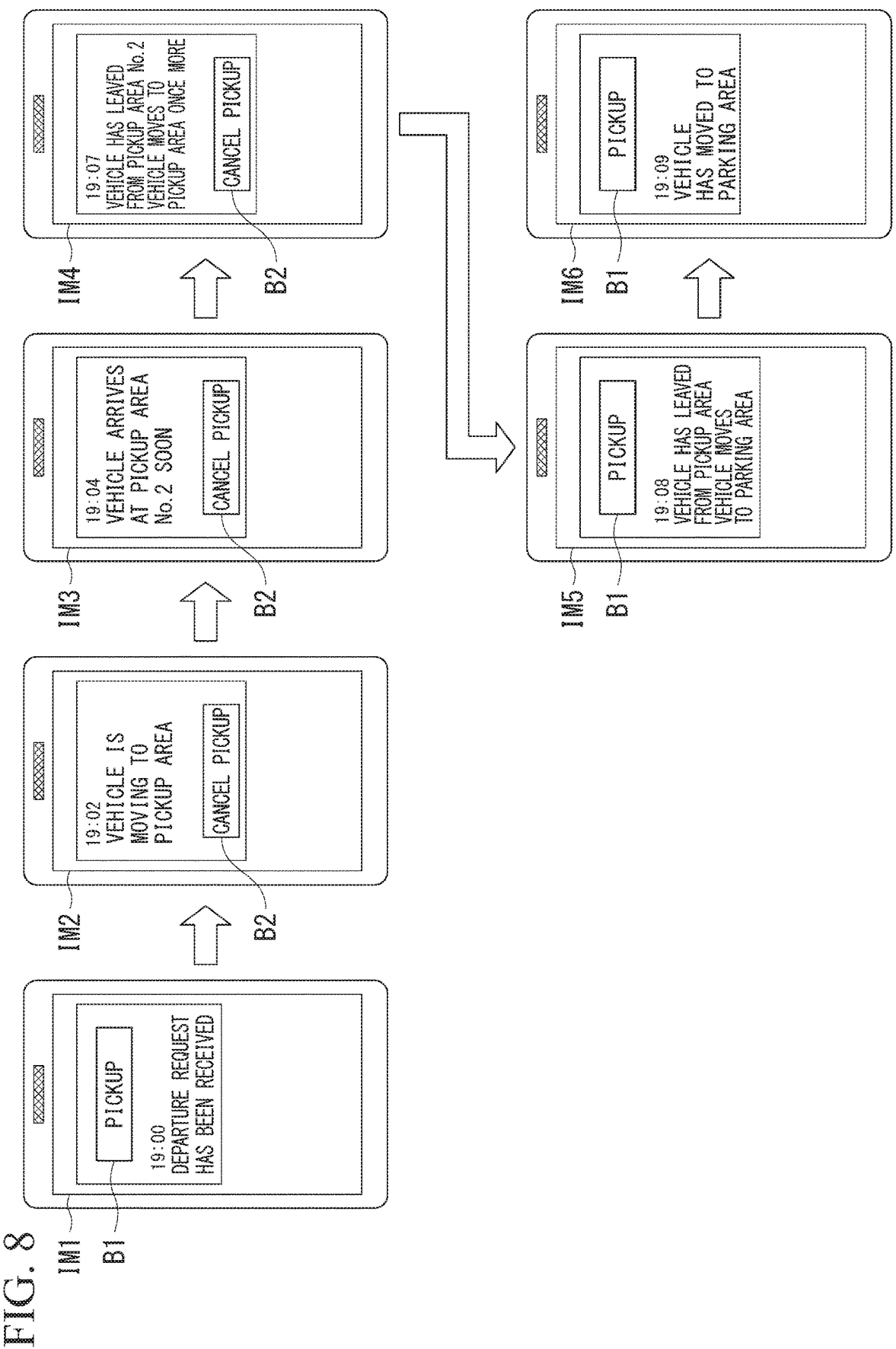
FIG. 8 is a diagram showing an example of transition of a display screen displayed by a terminal device of an occupant communicating with a communication device.

FIG. 8 is a diagram showing an example of transition of a display screen displayed by a terminal device of an occupant communicating with a communication device 20. First, the occupant transmits a pickup request by pressing a pickup button B1 of a dedicated application causing the own vehicle M to depart. A screen image IM1 in FIG. 8 is an example of a screen displayed by the dedicated application. In the screen image IM1, for example, information supplied by the parking lot management device 400, such as an estimated time of arrival of the own vehicle M at the stopping area 310 or the number of vehicles which are moving to the stopping area 310, may be displayed. In the screen image IM1, an input of an estimated time of departure or an estimated time of arrival (a time at which arrival is expected) at the stopping area 310 may be received in addition to the display of the pickup button B1. Hereinafter, it is assumed that the dedicated application appropriately notifies the occupant of positional information regarding the own vehicle M in the description.

The autonomous parking control unit 142 controls the communication device 20 to issue a pickup request to the parking lot management device 400. When movement from the parking area PA to the stopping area 310 starts, as shown in a screen image IM2 of FIG. 8, the terminal device used by the occupant is notified whether the own vehicle M is heading for a certain area or has stopped via the communication device 20. When a number or a name for identifying a mark is set in the stopping area 310 in which the own vehicle M is scheduled to stop, the autonomous parking control unit 142 may notify the terminal device of the occupant of the information, as shown in a screen image IM3 of FIG. 8.

When the own vehicle M is lined up in the motorcade again due to an occupant not having appeared despite the fact that the own vehicle M has waited in the stopping area 310, the autonomous parking control unit 142 notifies the terminal device of the occupant of information shown in a screen image IM4 of FIG. 8. When the own vehicle M is caused to move to the parking area PA due to the occupant not having appeared despite the fact that the own vehicle M has waited in the stopping area 310 by the predetermined number of times, the autonomous parking control unit 142 notifies the terminal device of the occupant of information shown in a screen image IM5 of FIG. 8. The dedicated application functioning as the terminal device of the occupant may display a button B2 for canceling the movement of the own vehicle M to the stopping area 310 and receiving an instruction to return to the parking area PA from the occupant at timings at which the screen images IM2 to IM4 are displayed, and may receive an operation.

The autonomous parking control unit 142 notifies the terminal device of the occupant of information shown in a screen image IM6 of FIG. 8 when the own vehicle returns to the parking area PA. In this way, the autonomous parking control unit 142 allows the occupant to easily estimate a timing at which the occupant will be able to get into the own vehicle M by notifying the occupant of an area in which the own vehicle M is located.

[Process Flow]

Figure 9:
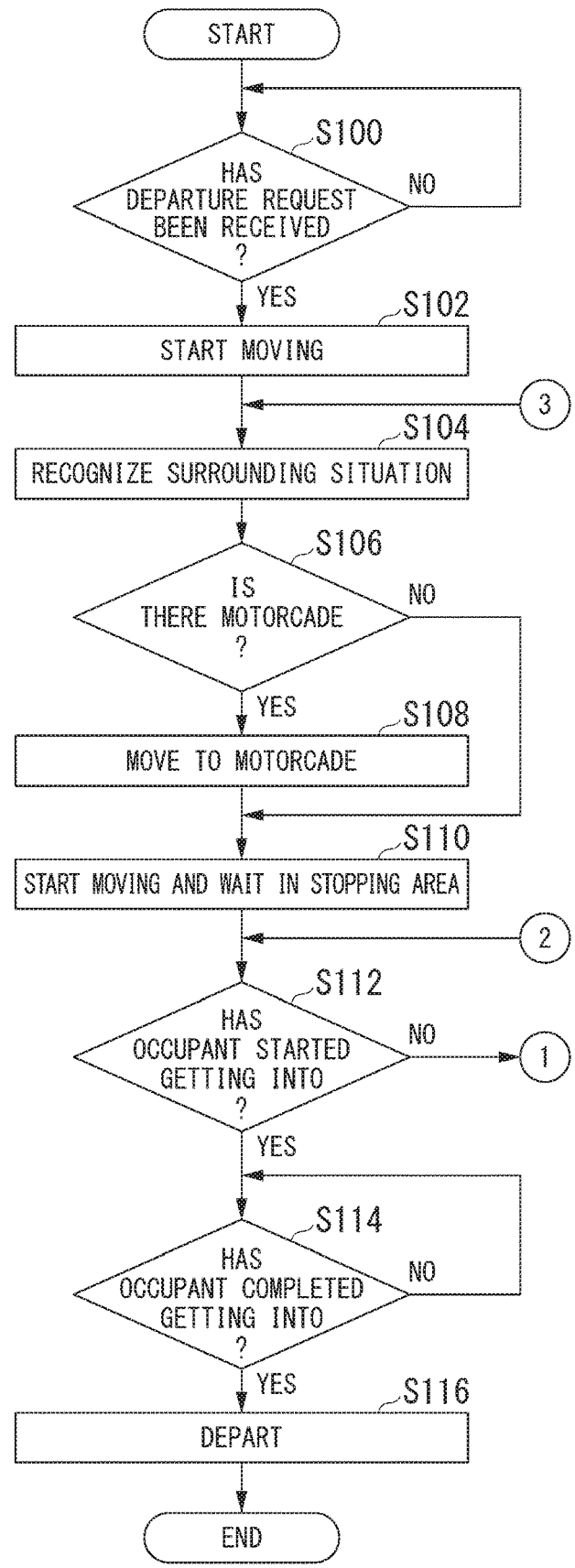
FIG. 9 is a flowchart showing an example of a flow of a departure process of an own vehicle using the automated driving control device.
Figure 10:
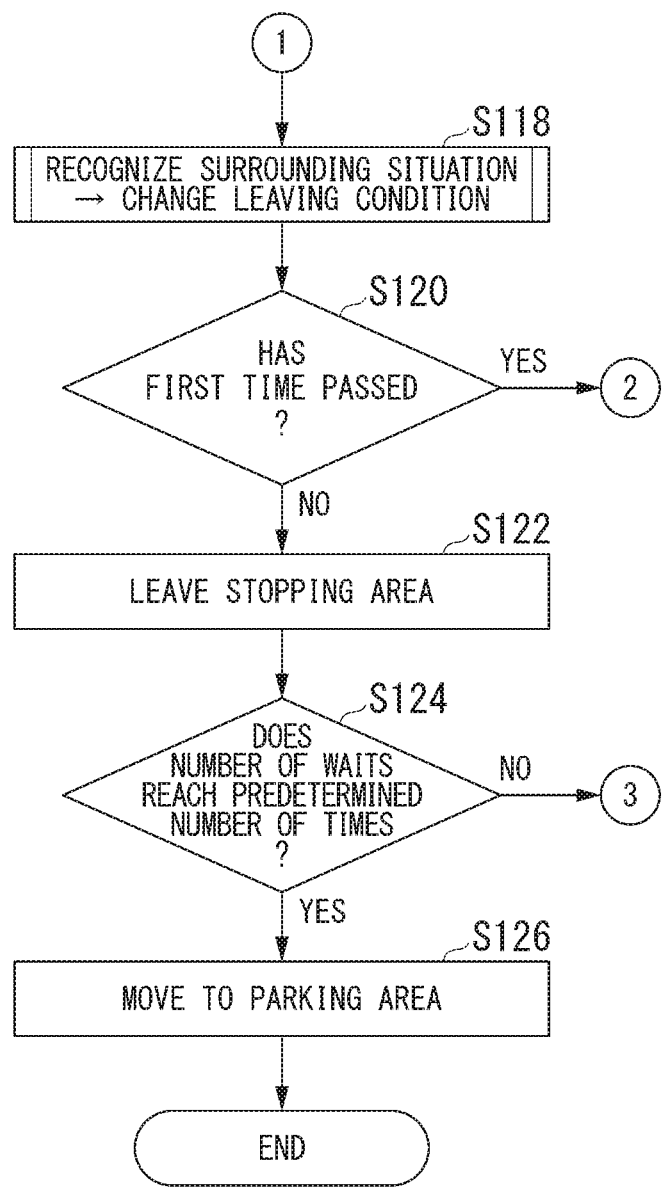
FIG. 10 is a flowchart showing an example of a flow of a departure process of the own vehicle using the automated driving control device.

FIGS. 9 and 10 are flowcharts showing examples of flows of a departure process of the own vehicle M using the automated driving control device 100.

FIG. 9 is a flowchart showing an example of a flow of a process of moving the own vehicle M from the parking area PA primarily until departure.

First, the autonomous parking control unit 142 determines whether a pickup request has been received from the terminal device of the occupant (step S100). When the autonomous parking control unit 142 determines that a pickup request has not been received, the autonomous parking control unit 142 repeats the process of step S100 periodically until the autonomous parking control unit 142 determines that a pickup request has been received. When the autonomous parking control unit 142 determines that a pickup request has been received, the autonomous parking control unit 142 starts movement to the stopping area 310 (step S102).

Subsequently, the surroundings recognizer 132 recognizes a surrounding situation (step S104). Subsequently, the autonomous parking control unit 142 determines whether the surroundings recognizer 132 has recognized that there is a motorcade (step S106). When it is recognized that there is a motorcade, the autonomous parking control unit 142 causes the own vehicle M to move to the motorcade and waits its turn to move to the stopping area 310 (step S108). When the own vehicle M heads the motorcade and the surroundings recognizer 132 recognizes that a vacant space occurs in the stopping area 310, the process proceeds to step S110. When it is recognized that there is no motorcade, the autonomous parking control unit 142 causes the own vehicle M to move to the stopping area 310 and starts waiting for the occupant after the vehicle stops inside the stopping area 310 (step S110).

After the process of step S110, the autonomous parking control unit 142 determines whether the occupant has started getting into based on a recognition result of the surroundings recognizer 132 (step S112). When the autonomous parking control unit 142 determines that the occupant starts getting into, the autonomous parking control unit 142 determines whether the occupant has completed getting into (step S114). When the autonomous parking control unit 142 determines that the occupant has completed getting into, the action plan generation unit 140 starts control for departure of the own vehicle M (step S116).

FIG. 10 is a flowchart showing an example of a flow of a process of causing the own vehicle M to move or wait so that the autonomous parking control unit 142 allows the occupant to get into the own vehicle M.

When it is recognized in the process of step S112 that the occupant does not start to getting into, the autonomous parking control unit 142 changes the condition in which the own vehicle leaves the stopping area 310 based on the surrounding situation of the stopping area 310 recognized by the surroundings recognizer 132 (step S118) and determines whether the first time has passed, that is, the own vehicle continues to wait (step S120). When the autonomous parking control unit 142 determines that the own vehicle M continues to wait, the autonomous parking control unit 142 returns the process to step S112. When the autonomous parking control unit 142 determines that the own vehicle M does not continue to wait, the autonomous parking control unit 142 causes the own vehicle M to leave the stopping area 310 (step S122).

Subsequently, the autonomous parking control unit 142 determines whether the number of waits reaches the predetermined number of times (step S124). When it is determined that the number of waits does not reach the predetermined number of times, the process returns to step S104. When it is determined that the number of waits reaches the predetermined number of times, the autonomous parking control unit 142 causes the own vehicle M to move the parking area PA (step S126). Here, the description of the process of the flowchart ends.

When the button B2 for receiving an instruction to cancel the movement of the own vehicle M to the stopping area 310 and return the own vehicle M to the parking area PA from the occupant is pressed, as shown in FIG. 8, during the processes of steps S102 to S112 and S118 to S124, the process which is being performed is stopped or omitted and the process proceed to step S126.

[Process Flow: Change in First Time]

Figure 11:
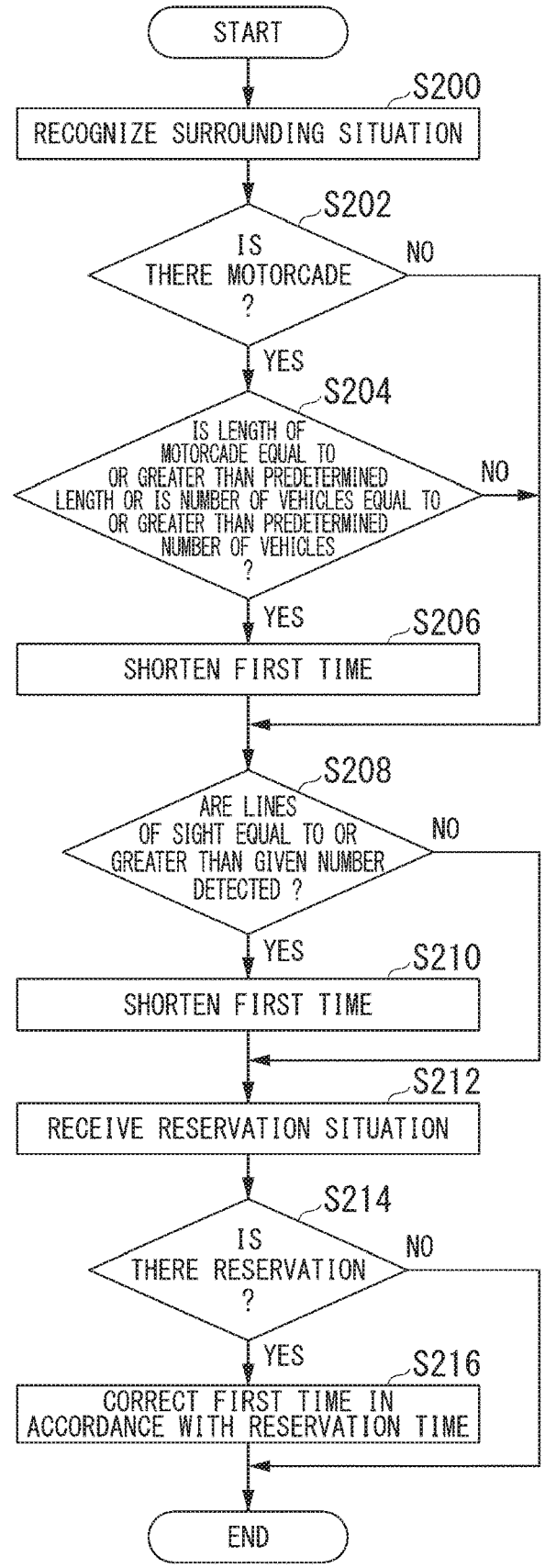
FIG. 11 is a flowchart showing an example of a flow of a first time changing process by the autonomous parking control unit.

FIG. 11 is a flowchart showing an example of a flow of a first time changing process by the autonomous parking control unit 142. The flowchart shown in FIG. 11 corresponds to the process of step S118 of FIG. 10.

First, the surroundings recognizer 132 recognizes a surrounding situation (step S200). Subsequently, the autonomous parking control unit 142 determines whether the surroundings recognizer 132 recognizes a motorcade (step S202). When the surroundings recognizer 132 does not recognize the motorcade, the autonomous parking control unit 142 causes the process to proceed to step S208. When the surroundings recognizer 132 recognizes the motorcade, the autonomous parking control unit 142 determines whether the length of the motorcade is equal to or greater than a predetermined length or the number of vehicles forming the motorcade is equal to or greater than the predetermined number of vehicles (step S204). When the autonomous parking control unit 142 determines that the length of the motorcade is equal to or greater than the predetermined length and the number of vehicles forming the motorcade is equal to or greater than the predetermined number of vehicles, the autonomous parking control unit 142 shortens the first time (step S206). When the autonomous parking control unit 142 determines that the length of the motorcade is less than the predetermined length and the number of vehicles forming the motorcade is less than the predetermined number of vehicles, the autonomous parking control unit 142 causes the process to proceed to step S208.

Subsequently, the autonomous parking control unit 142 determines whether the surroundings recognizer 132 detects the lines of sight equal to or greater than a given number (step S208). When it is determined that the autonomous parking control unit 142 does not detect the lines of sight equal to or greater than the given number, the autonomous parking control unit 142 causes the process to proceed to step S212. When the autonomous parking control unit 142 detects the lines of sight equal to or greater than the given number, the autonomous parking control unit 142 shortens the first time (step S210).

Subsequently, the autonomous parking control unit 142 receives a reservation situation via the communication device 20 (step S212). Subsequently, the autonomous parking control unit 142 determines whether there is a reservation (which may be a reservation for the own vehicle M or may be a reservation for a rear vehicle waiting in the motorcade) (step S214). When the autonomous parking control unit 142 determines that there is the reservation, the autonomous parking control unit 142 corrects the first time in accordance with the reservation time (step S216). When the autonomous parking control unit 142 determines that there is no reservation, the autonomous parking control unit 142 ends the process. Here, the description of the process of the flowchart ends.

When it is recognized in step S202 of the flowchart shown in FIG. 11 that there is no motorcade, the autonomous parking control unit 142 may perform a process of lengthening the first time.

As described above, the automated driving control device 100 according to the first embodiment includes: the surroundings recognizer 132 that recognizes a surrounding situation of the own vehicle M; the action plan generation unit 140 and the second control unit 160 that control steering and a speed of the own vehicle M based on a recognition result of the surroundings recognizer 132 irrespective of an operation by an occupant; and the communication device 20 that communicates with an external device such as the parking lot management device 400. When the communication device 20 receives a pickup request for requesting the own vehicle M to move from the parking area PA and causing the occupant to get into the own vehicle M in the stopping area 310, the autonomous parking control unit 142 causes the own vehicle M to move from the parking area PA to the stopping area 310 in accordance with a movement start time included in the pickup request or an estimated time of arrival at the stopping area 310 and changes the condition that the own vehicle leaves the stopping area 310 based on the surrounding situation recognized by the surroundings recognizer 132 near the stopping area 310, such as another vehicle or the like moved to the stopping area 310. Even when the occupant arrives late at the carriage porch area 320, the occupant can be allowed to get into the vehicle more smoothly by causing the own vehicle M to leave the stopping area 310 once to yield the stopping area 310 to another vehicle, and then causing the own vehicle M to move to the stopping area 310 again or wait in the stopping area 310 or the parking area PA so that a traffic flow of other vehicles does not delay.

Second Embodiment

A vehicle system 1 according to a second embodiment can be realized with a similar configuration to that of the vehicle system 1 according to the first embodiment. Hereinafter, the same names and the same reference signs as those of the configuration of the vehicle system 1 according to the first embodiment are used to describe only differences.

Figure 12:
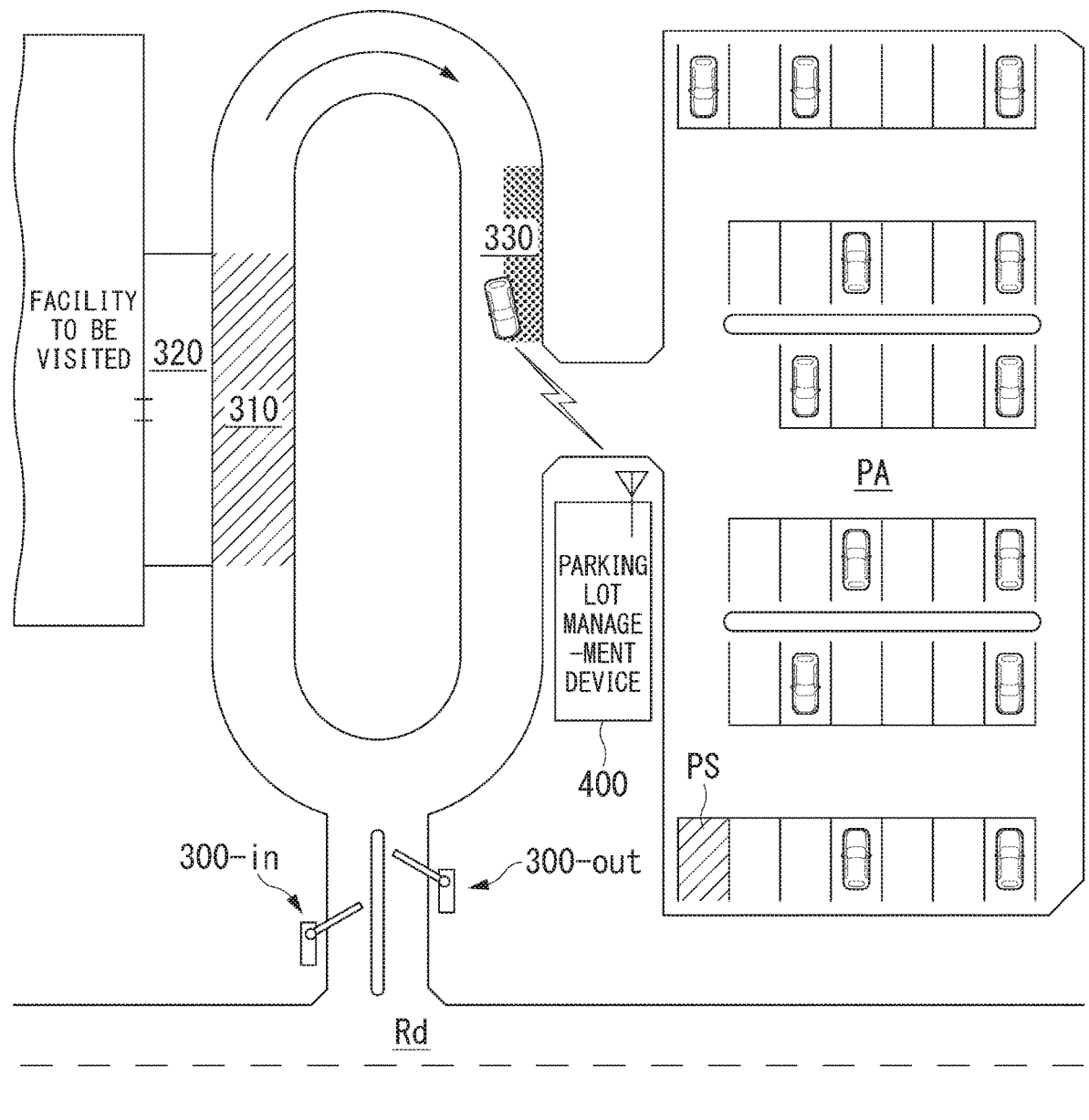
FIG. 12 is a diagram schematically showing a scenario in which an autonomous parking event is performed according to a second embodiment.

FIG. 12 is a diagram schematically showing a scenario in which an autonomous parking event is performed according to a second embodiment. In a parking lot shown in FIG. 12, a temporary evacuation area 330 which is a region in which vehicles are caused to stop temporarily at the time of further arrangement of a traffic flow inside the parking lot is set in a parking lot established as an annex of the facility to be visited, as shown in FIG. 3.

[Temporary Evacuation Area]

For example, when the own vehicle M receives a pickup request from an occupant and moves to the stopping area 310, and then leaves the stopping area 310 without allowing the occupant to get into the own vehicle M, the autonomous parking control unit 142 adjusts an estimated time of arrival at the stopping area 310 by causing the own vehicle M to move to the temporary evacuation area 330 before causing the own vehicle M to move to the stopping area 310 again. When the own vehicle M leaves the stopping area 310 without allowing the occupant to get into the own vehicle M and the number of times the own vehicle M lines up in the motorcade after starts from the parking area PA reaches the predetermined number of times, the autonomous parking control unit 142 selects whether to move to the temporary evacuation area 330 before turning the own vehicle M to the parking area PA.

For example, the autonomous parking control unit 142 determines whether to cause the own vehicle M to move and wait in the temporary evacuation area 330 or cause the own vehicle M to move to the parking area PA based on a surrounding situation recognized by the surroundings recognizer 132. For example, the autonomous parking control unit 142 determines to move the own vehicle M to the temporary evacuation area 330 when the surroundings recognizer 132 recognizes that there is a vacant space in which the own vehicle M can stop although another vehicle stops in the temporary evacuation area 330. When the surroundings recognizer 132 recognizes that the temporary evacuation area 330 is full during the movement of the own vehicle M to the temporary evacuation area 330 or the surroundings recognizer 132 recognizes that the length of the motorcade is equal to or greater than the predetermined length, the autonomous parking control unit 142 determines that the own vehicle M moves to the parking area PA.

The autonomous parking control unit 142 may transmit an inquiry about whether the own vehicle M moves to the temporary evacuation area 330 to the parking lot management device 400 or moves to the parking area PA via the communication device 20 and may determine a movement destination with reference to a response to the inquiry.

When the own vehicle M is kept and stops inside the temporary evacuation area 330, the autonomous parking control unit 142 starts measuring a temporary evacuation time as in the waiting process in the stopping area 310. When a second time (for example, about 5 to 10 [min]) has passed after the temporary evacuation, the autonomous parking control unit 142 may retry allow the occupant to get into the own vehicle M by causing the own vehicle M to move to the stopping area 310 again.

The second time may vary depending on a surrounding situation recognized by the surroundings recognizer 132. For example, when it is recognized that there is no other vehicles in the temporary evacuation area 330 and the length of the motorcade is less than the predetermined length, it is analyzed that the degree of congestion inside the parking lot is low and the second time is determined to be set longer (for example, about 10 to 15 [min]). When the surroundings recognizer 132 recognizes that the temporary evacuation area 330 is full and a temporary evacuation time of the own vehicle M in the temporary evacuation area 330 is longer than that of other vehicles, the autonomous parking control unit 142 may cause the second time to be short or cause the own vehicle M to move to the parking area PA despite the fact that the second time has not passed.

For example, the autonomous parking control unit 142 notifies the terminal device of the occupant of the position of the own vehicle M via the communication device 20 at a timing at which temporary evacuation in the temporary evacuation area 330 starts or a timing at which the own vehicle M leaves the temporary evacuation area 330. When a pickup request is received again from the terminal device used by the occupant, the autonomous parking control unit 142 causes the own vehicle M to leave the temporary evacuation area 330 and move to the stopping area 310 again (line up in a motorcade when there is the motorcade).

When the own vehicle M leaves the temporary evacuation area 330 and moves to the stopping area 310, the autonomous parking control unit 142 may or may not reset the number of times the own vehicle M lines up the motorcade. For example, when the own vehicle M leaves the temporary evacuation area 330 and moves to the stopping area 310 and the surroundings recognizer 132 recognizes that the motorcade does not move to the stopping area 310 or recognizes that the length of the motorcade is less than the predetermined length, it can be said that the own vehicle M may line up in the motorcade moving to the stopping area 310 again despite the fact that the own vehicle M leaves the stopping area 310 again without allowing the occupant to get into since the parking lot is not much congested. Accordingly, the autonomous parking control unit 142 resets the number of times the own vehicle M lines up in the motorcade when the own vehicle M leaves the temporary evacuation area 330 in this case.

[Notification to External Device]

Figure 13:
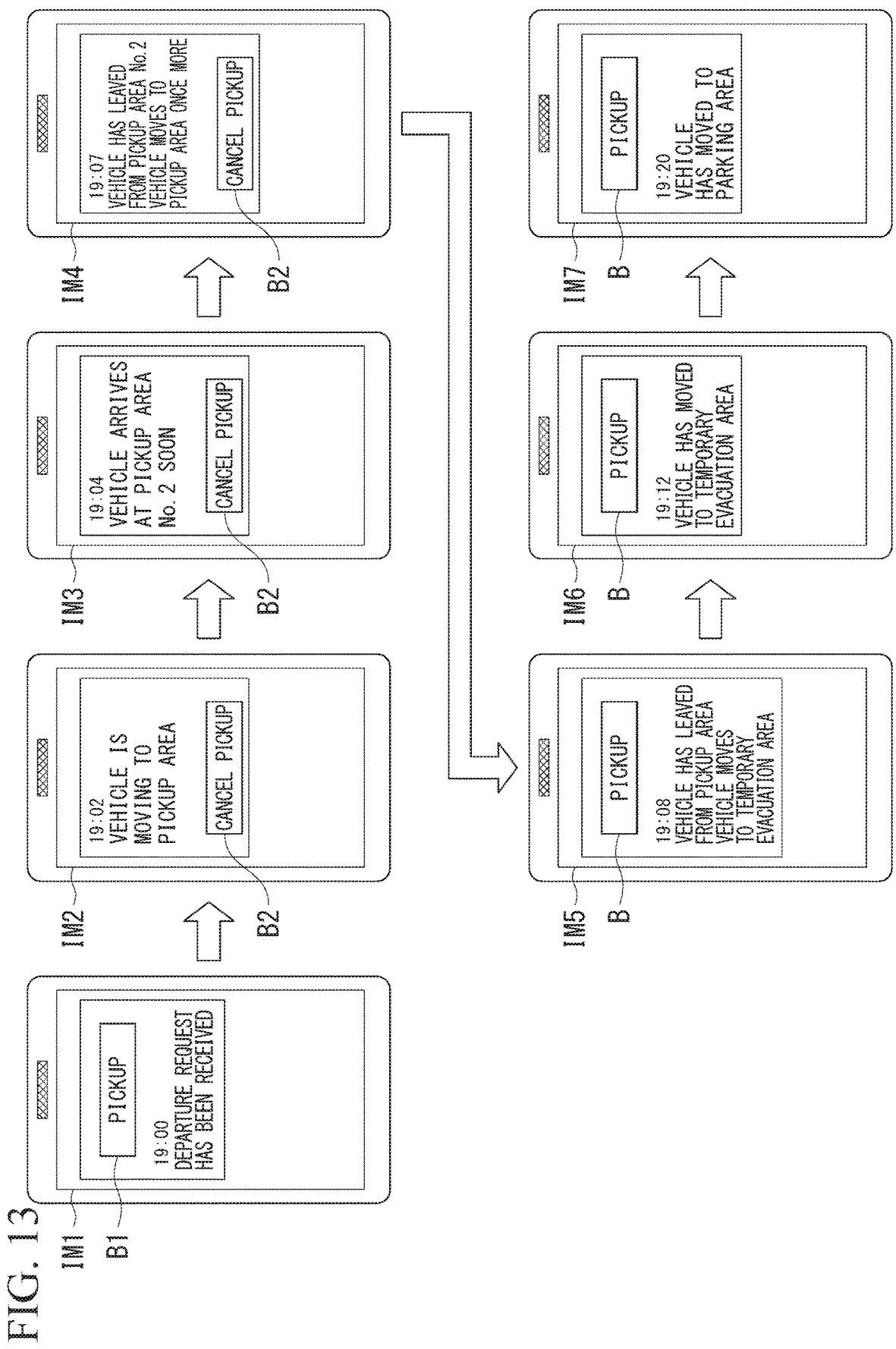
FIG. 13 is a diagram showing an example of transition of a display screen displayed by a terminal device of an occupant communicating with a communication device according to the second embodiment.

FIG. 13 is a diagram showing an example of transition of a display screen displayed by a terminal device of an occupant communicating with the communication device 20 according to the second embodiment. Screen images IM1 to IM4 shown in FIG. 13 are similar to the screen images IM1 to IM4 shown in FIG. 8. Accordingly, screen images IM5 to IM7 will be described below.

When the own vehicle M is caused to move the temporary evacuation area 330 since the occupant does not appear despite the fact that the own vehicles M waits in the stopping area 310 the predetermined number of times, the autonomous parking control unit 142 notifies the terminal device of the occupant of information shown in the screen image IM5 of FIG. 8.

When the temporary evacuation in the temporary evacuation area 330 starts, the autonomous parking control unit 142 notifies the terminal device of the occupant of information shown in the screen image IM6 of FIG. 8. When the second time has passed after start of the temporary evacuation in the temporary evacuation area 330 and the own vehicle M returns to the parking area PA, the autonomous parking control unit 142 notifies the terminal device of the occupant of information shown in the screen image IM7 of FIG. 8.

A dedicated application functioning as the terminal device of the occupant may display the pickup button B1 for transmitting a pickup request to the own vehicle M again at timings at which the screen images IM5 to IM7 are displayed and may receive the operation. The dedicated application functioning as the terminal device of the occupant may display a button B2 for canceling the re-lining of the own vehicle M in the motorcade and receiving an instruction to return to the parking area PA from the occupant at timings at which the screen images IM2 to IM4 are displayed, and may receive the operation.

[Process Flow]

Figure 14:
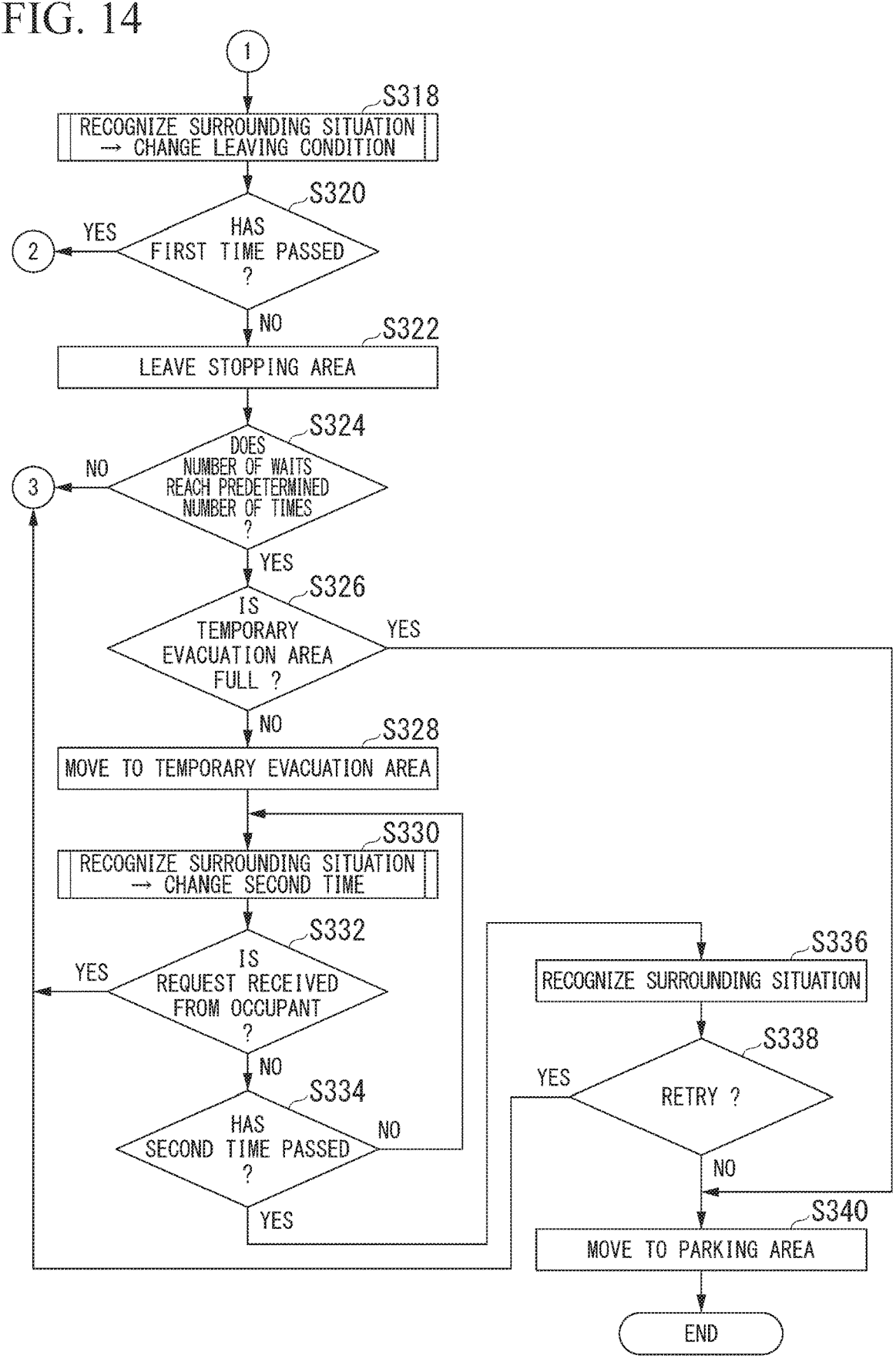
FIG. 14 is a flowchart showing an example of a flow of a departure process of the own vehicle by an automated driving control device according to the second embodiment.

FIG. 14 is a flowchart showing an example of a flow of a departure process of the own vehicle M by the automated driving control device 100 according to the second embodiment. The flowchart shown in FIG. 14 corresponds to FIG. 10 in the first embodiment and is a process performed when it is determined in step S112 of the process of the flowchart shown in FIG. 9 that the occupant does not start getting into. Steps S118 to S124 of FIG. 10 correspond to steps S318 to S324 of FIG. 14. Step S126 of FIG. 10 corresponds to step S340 of FIG. 14. Accordingly, steps S326 to S338 will be mainly described below.

When it is determined in step S324 that the number of waits reaches the predetermined number of times, the surroundings recognizer 132 recognizes whether the temporary evacuation area 330 is full (step S326). When the surroundings recognizer 132 recognizes that the temporary evacuation area 330 is full, the autonomous parking control unit 142 causes the process to step S336. When the surroundings recognizer 132 recognizes that the temporary evacuation area 330 is not full, the autonomous parking control unit 142 causes the own vehicle M to move to the temporary evacuation area 330 (step S328) and causes the surroundings recognizer 132 to recognize a surrounding situation of the temporary evacuation area 330, and change the temporary evacuation condition (step S330).

Subsequently, the autonomous parking control unit 142 determines whether a pickup request for moving the own vehicle to the stopping area 310 is received from the occupant (step S332). When it is determined that the pickup request is received, the process returns to step S104 of FIG. 8. When it is determined that the pickup request for moving the own vehicle M to the stopping area 310 is not received, the autonomous parking control unit 142 determines whether the second time has passed (step S334). When it is determined that the second time has not passed, the autonomous parking control unit 142 returns the process to step S330. When it is determined that the second time has passed, the surroundings recognizer 132 recognizes a surrounding situation (step S336). Subsequently, the autonomous parking control unit 142 causes the own vehicle M to move the stopping area 310 again based on a recognition result by the surroundings recognizer 132 in step S336 and determines whether to retry to cause the occupant to get into (step S338). When the autonomous parking control unit 142 determines to retry to cause the occupant to get into, the autonomous parking control unit 142 returns the process to step S104 of FIG. 8. When the autonomous parking control unit 142 does not determine to retry to cause the occupant to get into, the autonomous parking control unit 142 causes the own vehicle M to leave the temporary evacuation area 330 and move to the parking area PA (step S340). Here, the description of the process of the flowchart ends.

[Process Flow: Second Time Changing]

Figure 15:
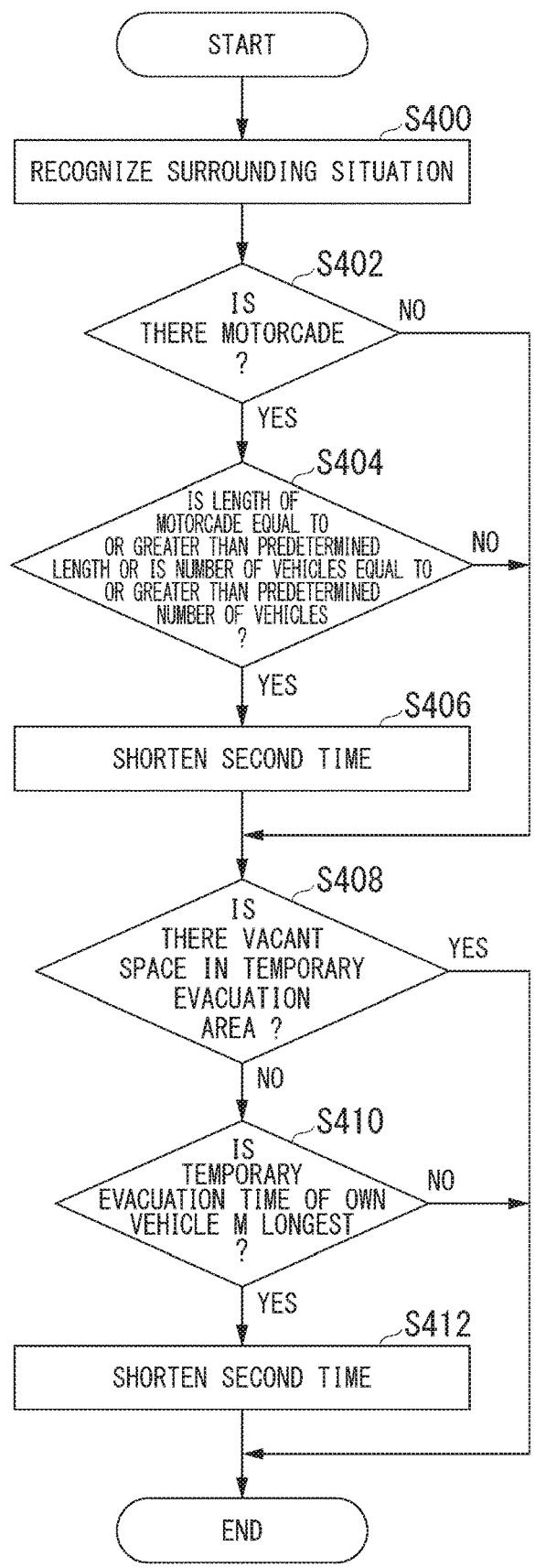
FIG. 15 is a flowchart showing an example of a flow of a second time changing process by the autonomous parking control unit according to the second embodiment.

FIG. 15 is a flowchart showing an example of a flow of a second time changing process by the autonomous parking control unit 142 according to the second embodiment. The flowchart shown in FIG. 15 corresponds to the process of step S330 of FIG. 14. First, the surroundings recognizer 132 recognizes a surrounding situation (step S400). Subsequently, the autonomous parking control unit 142 determines whether the surroundings recognizer 132 recognizes a motorcade (step S402). When the surroundings recognizer 132 does not recognize the motorcade, the autonomous parking control unit 142 causes the process to proceed to step S308. When the surroundings recognizer 132 recognizes the motorcade, the autonomous parking control unit 142 determines whether the length of the motorcade is equal to or greater than a predetermined length or the number of vehicles forming the motorcade is equal to or greater than the predetermined number of vehicles (step S404). When the autonomous parking control unit 142 determines that the length of the motorcade is equal to or greater than the predetermined length and the number of vehicles forming the motorcade is equal to or greater than the predetermined number of vehicles, the autonomous parking control unit 142 shortens the second time (step S406). When the autonomous parking control unit 142 determines that the length of the motorcade is less than the predetermined length and the number of vehicles forming the motorcade is less than the predetermined number of vehicles, the autonomous parking control unit 142 causes the process to proceed to step S408.

Subsequently, the surroundings recognizer 132 determines whether there is a vacant space in the temporary evacuation area 330 (step S408). When the surroundings recognizer 132 determines that there is the vacant space, the autonomous parking control unit 142 ends the process. When the surroundings recognizer 132 determines there is no vacant space and that the parking lot is full, it is determined whether a temporary evacuation time of the own vehicle M is the longest among the vehicles stopping in the temporary evacuation area 330 (step S410). When it is determined that the temporary evacuation time of the own vehicle M is the longest, the autonomous parking control unit 142 shortens the second time (step S412). When it is determined that the temporary evacuation time of the own vehicle M is not the longest, the process of the flowchart ends.

In addition to the advantages as those of the first embodiment, the automated driving control device 100 according to the above-described second embodiment can realize a more flexible waiting aspect by causing the own vehicle to move and wait in the temporary evacuation area 330 rather than the parking area PA after causing the own vehicle to leave the stopping area 310. Thus, the occupant can be caused to get into the vehicle more smoothly.

[Hardware Configuration]

Figure 16:
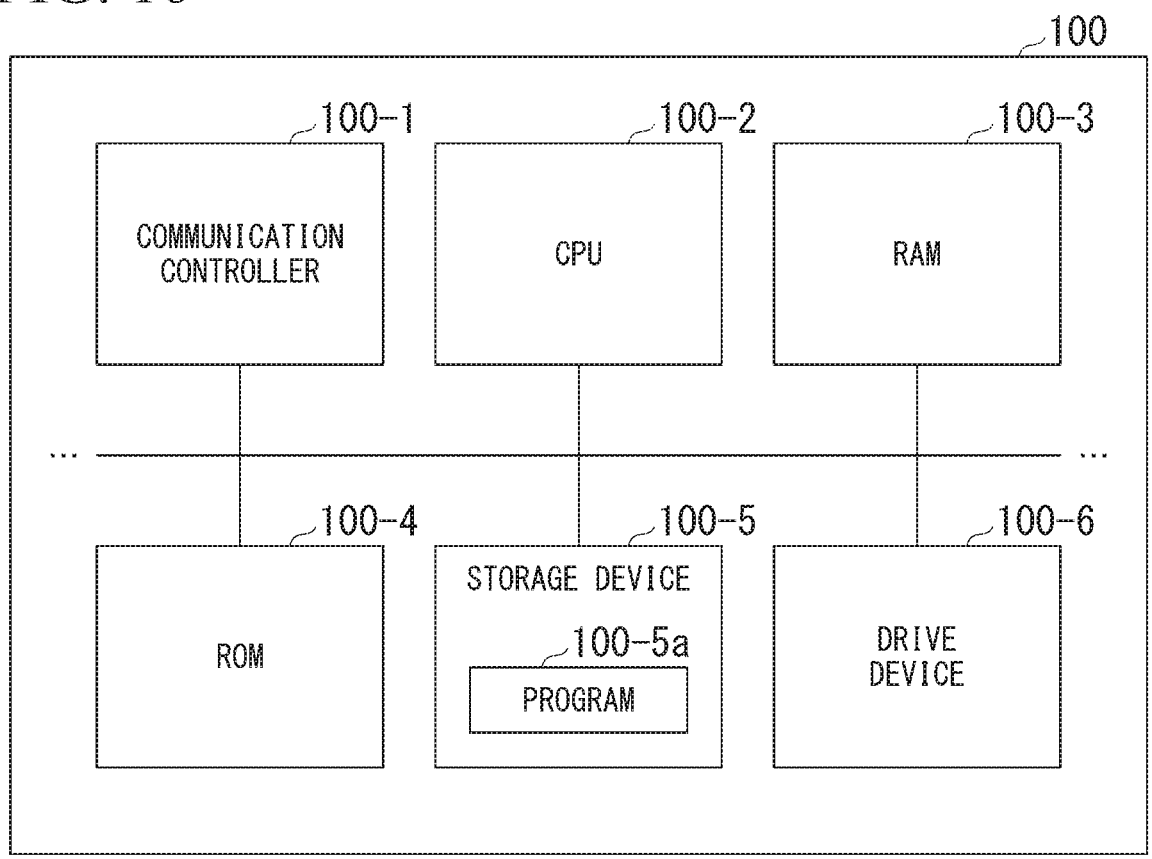
FIG. 16 is a diagram showing an example of a hardware configuration of the automated driving control device according to an embodiment.

FIG. 16 is a diagram showing an example of a hardware configuration of the automated driving control device 100 according to an embodiment. As shown, the automated driving control device 100 is configured such that a communication controller 100-1, a CPU 100-2, a (random access memory) RAM 100-3 that is used as a working memory, a read-only memory (ROM) 100-4 that stores a boot program or the like, a storage device 100-5 such as a flash memory or a hard disk drive (HDD), a drive device 100-6, and the like are connected to each other via an internal bus or a dedicated communication line. The communication controller 100-1 performs communication with constituent element other than the automated driving control device 100. The storage device 100-5 stores a program 100-5a that is executed by the CPU 100-2. The program is loaded on the RAM 100-3 by a direct memory access (DMA) controller (not shown) to be executed by the CPU 100-2. Thus, one or both of the first control unit 120 and the second control unit 160 are realized.

The above-described embodiment can be expressed as follows:

the vehicle control device including:
a storage device configured to store a program; and
a hardware processor,
wherein by executing the program stored in the storage device, the hardware processor recognizes a surrounding situation of a vehicle,
controls steering and a speed of the vehicle based on a recognition result of the surrounding situation,
receives a pickup request that is transmitted by a communication terminal used by an occupant, and allows the occupant to get into the vehicle and allows the vehicle to leave a parking lot, and
causes the vehicle to move from a parking area to a stopping area when the pickup request is received, and change a condition for the vehicle to leave the stopping area based on a surrounding situation recognized in the stopping area.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, the above-described first time may vary in accordance with occupants. When the occupants include an elderly person, a baby, and an occupant using a wheelchair or the like, the autonomous parking control unit 142 may omit a process of setting the first time to be longer or setting the first time to be shorter in consideration of a possibility of a movement time in the carriage porch area 320 being longer.

For example, when the surroundings recognizer 132 may not recognize the length of the motorcade in the stopping area 310, the autonomous parking control unit 142 may set the first time based on a time necessary for the own vehicle M to leave the parking area PA, the stopping area 310, the temporary evacuation area 330, or the like and arrive at the stopping area 310. When the time necessary to arrive at the stopping area 310 is longer than a time necessary to arrive at the stopping area 310 in the last time, the autonomous parking control unit 142 performs a process of shortening the first time on the assumption that there are other many vehicles moving to the stopping area 310 and there is a congestion (the motorcade is longer). The autonomous parking control unit 142 may use a standard time set by the parking lot management device 400 or the like or the degree of congestion of people waiting for vehicles near the carriage porch area 320 as a reference of determining whether the time necessary to arrive at the stopping area 310 is long.

What is claimed is:
1. A vehicle control device comprising:
at least one memory storing instructions, and
at least one processor configured to execute the instructions,
wherein the at least one processor is configured to:
recognize a surrounding situation of a vehicle;
control steering and a speed of the vehicle based on a recognition result of the surrounding situation irrespective of an operation by an occupant;
when a communication device configured to communicate with an external device receives a pickup request for requesting the vehicle to move from a parking area and causing the occupant to get into the vehicle in a stopping area, causes the vehicle to move from the parking area to the stopping area;
cause the vehicle to leave the stopping area when a first time has passed after arrival at the stopping area;
change the first time based on a result determined based on the surrounding situation;
when another vehicle arriving at the stopping area later than the vehicle waits in front of the stopping area in a motorcade, recognize a length of the motorcade or a number of vehicles in the motorcade; and
change the first time based on the length of the motorcade or the number of vehicles in the motorcade.

2. The vehicle control device according to claim 1,
wherein the at least one processor is further configured to cause the vehicle to move and wait in a temporary evacuation area different from the parking area after the driving control unit causes the vehicle to leave the stopping area.

3. The vehicle control device according to claim 2,
wherein the at least one processor is further configured to cause the vehicle to move to the parking area again when the driving control unit causes the vehicle to move and then wait in the temporary evacuation area and a second time has passed.

4. The vehicle control device according to claim 2,
wherein the at least one processor is further configured to cause the vehicle to move to the parking area when the number of times the vehicle is caused to leave the stopping area reaches a predetermined number of times after the reception of the pickup request.

5. The vehicle control device according to claim 2,
wherein the at least one processor is further configured to cause the vehicle to move to the parking area rather than the temporary evacuation area when it is recognized that the temporary evacuation area is full during the movement of the vehicle to the temporary evacuation area.

6. The vehicle control device according to claim 1,
wherein the communication device receives a reservation situation including a reservation time and whether to make a reservation for another vehicle to use the stopping area, and
wherein the at least one processor is further configured to correct the first time based on a difference between the reservation time received by the communication device and a residence time in the stopping area.

7. The vehicle control device according to claim 1,
wherein the communication device notifies the external device of an area for which the vehicle heads or whether the vehicle stops.

8. The vehicle control device according to claim 1, wherein the at least one processor is further configured to the driving control unit causes the vehicle to leave the stopping area before the first time passes after the arrival at the stopping area when the vehicle waits for the occupant in the stopping area and lines of sight of people equal to or greater than a given number of people seeing an own vehicle other than the occupant is detected.

9. A vehicle control method using an in-vehicle computer, comprising:

recognizing a surrounding situation of a vehicle;
controlling steering and a speed of the vehicle based on a recognition result of the surrounding situation;
receiving a pickup request that is transmitted by a communication terminal used by an occupant, and allows the occupant to get into the vehicle and allows the vehicle to leave a parking lot;
causing the vehicle to move from a parking area to a stopping area when the pickup request is received;
causing the vehicle to leave the stopping area when a first time has passed after arrival at the stopping area;
changing the first time based on a result determined based on the surrounding situation;
when another vehicle arriving at the stopping area later than the vehicle waits in front of the stopping area in a motorcade, recognizing a length of the motorcade or a number of vehicles in the motorcade; and
changing the first time based on the length of the motorcade or the number of vehicles in the motorcade.

10. A non-transitory computer-readable recording medium recording a vehicle control program causing an in-vehicle computer to:

recognize a surrounding situation of a vehicle;
control steering and a speed of the vehicle based on a recognition result of the surrounding situation;
receive a pickup request that is transmitted by a communication terminal used by an occupant, and allows the occupant to get into the vehicle and allows the vehicle to leave a parking lot;
cause the vehicle to move from a parking area to a stopping area when the pickup request is received;
cause the vehicle to leave the stopping area when a first time has passed after arrival at the stopping area;
change the first time based on a result determined based on the surrounding situation;
when another vehicle arriving at the stopping area later than the vehicle waits in front of the stopping area in a motorcade, recognize a length of the motorcade or a number of vehicles in the motorcade, and
change the first time based on the length of the motorcade or the number of vehicles in the motorcade.

* * * * *